(12) United States Patent
Tokuda et al.

(10) Patent No.: US 7,945,731 B2
(45) Date of Patent: May 17, 2011

(54) METHOD FOR READING DATA WITH STORAGE SYSTEM, DATA MANAGING SYSTEM FOR STORAGE SYSTEM AND STORAGE SYSTEM

(75) Inventors: Seisuke Tokuda, Hachioji (JP); Akira Shimizu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 11/955,048

(22) Filed: Dec. 12, 2007

(65) Prior Publication Data
US 2009/0125678 A1    May 14, 2009

(30) Foreign Application Priority Data

Nov. 9, 2007   (JP) ................................ 2007-291936

(51) Int. Cl.
*G06F 12/02* (2006.01)
(52) U.S. Cl. ......... 711/114; 711/162; 711/202; 707/634
(58) Field of Classification Search ........................ None
See application file for complete search history.

(56) References Cited

U.S. PATENT DOCUMENTS

| | | | |
|---|---|---|---|
| 5,778,252 A * | 7/1998 | Sangveraphunsiri et al. .. | 710/21 |
| 2003/0088734 A1 * | 5/2003 | Cavallo et al. ................ | 711/114 |
| 2003/0221063 A1 * | 11/2003 | Eguchi et al. ................. | 711/114 |
| 2003/0229645 A1 * | 12/2003 | Mogi et al. ..................... | 707/102 |
| 2005/0193058 A1 * | 9/2005 | Yasuda et al. ................. | 709/203 |
| 2005/0267878 A1 * | 12/2005 | Mogi et al. ........................ | 707/3 |
| 2008/0120463 A1 * | 5/2008 | Ashmore ....................... | 711/114 |

OTHER PUBLICATIONS

"Understanding the Linux Kernel" by D. Bovet, et al., 3$^{rd}$ ed., pp. 580-583, O'Reilly, Nov. 2005.

* cited by examiner

*Primary Examiner* — Kaushikkumar Patel
(74) *Attorney, Agent, or Firm* — Brundidge & Stanger, P.C.

(57) ABSTRACT

Provided is a database management system obtains storage mapping information which associates addresses in a plurality of physical disk drives within the storage system and addresses in logical disk drives including these physical disk drives, to create queues individually for each of the plurality of physical disk drives. The database management system receives a plurality of read requests which request to read data out of the physical disk drives via the logical disk drives provided by the storage system, sorts the read requests by their destination, and accumulates the read requests in the respective queues associated with the request destination physical disk drives. The database management system reallocates the accumulated read requests into an order that shortens the data read time in each physical disk drive, and then issues the read requests to the storage system.

18 Claims, 14 Drawing Sheets

STORAGE MAPPING INFORMATION 34

| HOST LOGICAL DISK DRIVE NUMBER 49 | HOST LOGICAL DISK DRIVE INTERNAL ADDRESS 50 | LOGICAL DISK DRIVE NUMBER 51 | LOGICAL DISK DRIVE INTERNAL ADDRESS 52 | PHYSICAL DISK DRIVE NUMBER 53 | PHYSICAL DISK DRIVE INTERNAL ADDRESS 54 | PARITY GROUP NUMBER 55 |
|---|---|---|---|---|---|---|
| 101 | 0~64K | 01 | 0~64K | 00 | 0~64K | 00 |
| 101 | 64K~128K | 01(→03) | 64K~128K (→64K~128K) | 01(→20) | 0~64K(→64K~128K) | 00(→02) |
| 101 | 128K~192K | 01 | 128K~192K | 02 | 0~64K | 00 |
| 101 | 192K~256K | 01 | 192K~256K | 00 | 64K~128K | 00 |
| ... | | | | | | |
| 102 | 0~64K | 02(→03) | 0~64K(→0~64K) | 10(→20) | 0~64K(→0~64K) | 01(→02) |
| 102 | 64K~128K | 02 | 64K~128K | 11 | 0~64K | 01 |
| ... | | | | | | |

FIG. 4

LOGICAL VOLUME MAPPING INFORMATION 82

| LOGICAL VOLUME NUMBER 90 | LOGICAL VOLUME INTERNAL ADDRESS 91 | HOST LOGICAL DISK DRIVE NUMBER 92 | HOST LOGICAL DISK DRIVE INTERNAL ADDRESS 93 |
|---|---|---|---|
| 01 | 0~128K | 01 | 0~128K |
| 01 | 128K~256K | 01(⇒02) | 128K~256K(⇒0~128K) |
| ... | ... | ... | ... |

FIG. 15

LOGICAL-PHYSICAL MAPPING INFORMATION 45

| LOGICAL VOLUME NUMBER 94 | LOGICAL VOLUME INTERNAL ADDRESS 95 | PHYSICAL DISK DRIVE NUMBER 96 | PHYSICAL DISK DRIVE INTERNAL ADDRESS 97 |
|---|---|---|---|
| 01 | 0~64K | 00 | 0~64K |
| 01 | 64K~128K | 01 (→20) | 0~64K (→64K~128K) |
| 01 | 128K~192K | 02 (⇒10→20) | 0~64K (⇒0~64K→0~64K) |
| 01 | 192K~256K | 00 (⇒11) | 64K~128K (⇒0~64K) |
| ... | ... | ... | ... |

FIG. 16

METHOD FOR READING DATA WITH STORAGE SYSTEM, DATA MANAGING SYSTEM FOR STORAGE SYSTEM AND STORAGE SYSTEM

CLAIM OF PRIORITY

The present application claims priority from Japanese application P2007-291936 filed on Nov. 9, 2007, the content of which is hereby incorporated by reference into this application.

BACKGROUND OF THE INVENTION

This invention relates to a technique that enables a computer to read data stored in a storage system.

In corporate activities, handling and utilizing a huge amount of business operation data has become essential. Therefore, the systems that multi-dimensionally analyze business operation data accumulated in massive amount in a database (hereinafter, referred to as "DB") have widely been diffused. In this analysis processing, a database management system (hereinafter, referred to as "DBMS") receives an inquiry and issues multiple data read requests to a storage system that stores the DB.

One of conventional technologies for executing multiple-data read processing efficiently is I/O scheduling. In I/O scheduling, a DBMS or similar application program (hereinafter, referred to as "AP"), or an operating system (hereinafter, referred to as "OS"), queues I/O requests. The AP or the OS identifies the logical block address (hereinafter, referred to as "LBA") of the access destination for each of the plurality of queued I/O requests, and reallocates the output order in a manner that shortens the seek time or rotational latency of physical disk drives within the storage system (see pages 580 to 583 of the third edition of "Understanding the LINUX KERNEL" written by Daniel P. Bovet et al. and published by O'Reilly, November 2005).

SUMMARY OF THE INVENTION

It is common for storage systems and OSs to have a function of virtualizing storage areas. Specifically, storage systems have as a storage area virtualization function a redundant array of independent disks (RAID) function, which combines storage areas of a plurality of physical disk drives in the storage system for redundancy and improved speed. OSs have a logical volume management function as a storage area virtualization function. The logical volume management function organizes storage areas recognizable to the OS into logical storage areas, and takes a snapshot which is a backup of data evacuated prior to an update to another storage area.

These virtualization functions cause internally dynamic data migration. With the RAID function of storage systems, the data migration is based on data lifecycle management, which dynamically changes the location of data according to the freshness or importance of the data. With the logical volume management function of OSs, the data migration is for evacuating pre-update data and keeping a snapshot. The dynamic data migration caused by the virtualization functions can change data location in physical disk drives disregarding stationary data placement recognizable to a DBMS or a similar AP.

I/O scheduling mentioned above issues read requests after queueing and reallocating the read requests based on stationary data placement recognizable to the AP or the OS. Accordingly, read requests reallocated by I/O scheduling in the presence of the internally dynamic data migration caused by the respective virtualization functions as described above are not in an optimum order (i.e., not grouped by their destination physical disk drive). In short, there arise problems in that reallocating queued read requests does not shorten the head seek time or rotational latency of physical disk drives if there is a change in data location after the AP or the OS recognizes the placement of data.

It is therefore an object of this invention to provide a data reading method that arranges read requests in an optimum order for each physical disk drive despite a change in data location caused by dynamic data migration within a storage system from the use of the storage system's virtualization functions and OS' virtualization functions.

A representative mode of this invention is a method of enabling a computer coupled to a storage system to read data out of a logical disk drive which is provided by the storage system and includes a plurality of physical disk drives, and the method includes the steps of: when a given condition is met (at regular intervals or upon reception of a notification about dynamic data migration within the storage system), obtaining, by the computer, first mapping information (storage mapping information) which associates addresses in the plurality of physical disk drives in the storage system with address in the logical disk drive; constructing, from the obtained first mapping information second mapping information (logical-physical mapping information), which associates addresses in the logical disk drive which are recognizable to the computer with addresses in the plurality of physical disk drives in the storage system, and creating a queue for each of the plurality of physical disk drives; upon reception of a plurality of read requests via the logical disk drive recognizable to the computer which request to read data out of the plurality of physical disk drives, using the second mapping information to identify which ones of the plurality of physical disk drives store the data requested by the plurality of read requests, and accumulating the plurality of read requests in the respective queues of the identified physical disk drives; and, after the plurality of read requests accumulated in the respective queues of the physical disk drives are reallocated into an order that shortens the data read time of the physical disk drives, issuing the plurality of read requests from the queues to the storage system.

This invention can thus issue data read requests in an optimum order based on data placement that reflects a dynamic change in physical location of data in a storage system, thereby making it possible to shorten and stabilize the time necessary to make a data inquiry to the storage system.

BRIEF DESCRIPTION OF THE DRAWINGS

FIG. 4 is a diagram showing an example of storage mapping information according to the first embodiment of this invention.

FIG. 15 is a diagram showing an example of logical volume mapping information according to the second embodiment of this invention.

FIG. 16 is a diagram showing an example of logical-physical mapping information according to the second embodiment of this invention.

DETAILED DESCRIPTION OF THE PREFERRED EMBODIMENTS

Embodiments of this invention will be described below with reference to the accompanying drawings. It should be noted that the following description does not limit this invention.

First Embodiment

Figure 1:
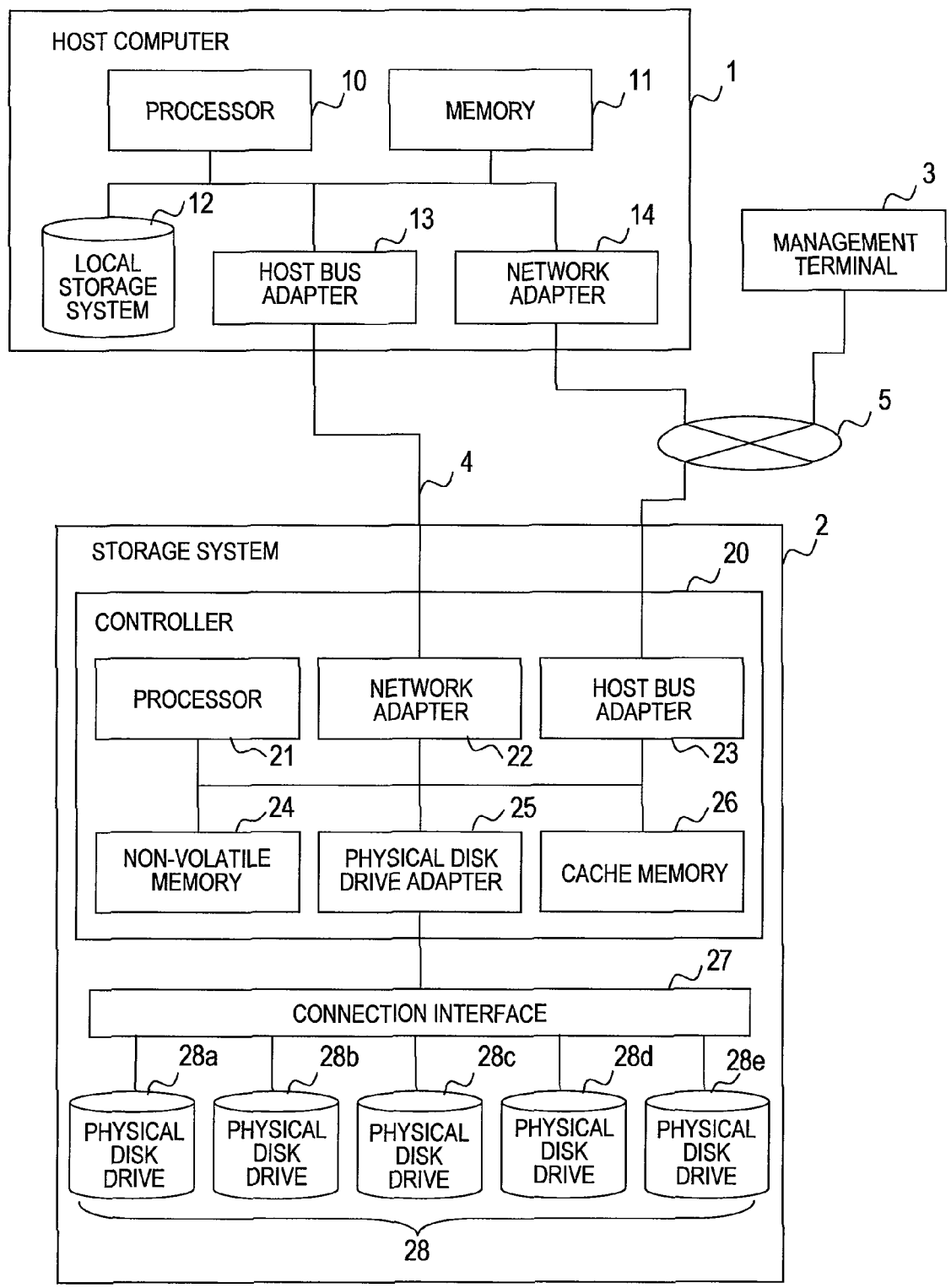
FIG. 1 is a block diagram showing the hardware configuration of an information processing system (computer system) according to a first embodiment of this invention.

FIG. 1 is a block diagram showing the hardware configuration of an information processing system (computer system) according to a first embodiment of this invention.

The information processing system of FIG. 1 has a host computer 1, a storage system 2, a management terminal 3, a network 4, and a network 5.

The host computer 1 is a computer such as a personal computer, a workstation, or a mainframe. The host computer 1 runs an operating system (OS) fit to the type of the computer, a database management system (DBMS) for accumulating and managing business operation data, and an application program (AP) for issuing inquiries to the DBMS. The OS, the DBMS, and the AP will be described later with reference to FIG. 2.

The host computer 1 has a processor 10, a memory 11, local storage system 12, a host bus adapter 13, and a network adapter 14.

The processor 10 executes the OS, the DBMS, the AP, and other programs. The memory 11 temporarily stores the programs executed by the processor 10 and data used by the programs. The local storage system 12 stores the AP, the DBMS, and other programs as well as data used by the programs. The host bus adapter 13 couples the network 4 and the host computer 1. The network adapter 14 couples the network 5 and the host computer 1.

The host computer 1 may have two or more processors 10 or the like for redundancy. The host computer 1 also has an input device and a display device which are not shown in the drawing.

The storage system 2 is a system containing a single storage device such as a disk drive or a plurality of storage devices such as a disk array. The storage system 2 stores data and programs used by the host computer 1. The storage system 2 receives an input/output (I/O) processing request from the host computer 1, executes I/O processing as requested, and sends the result of the processing to the host computer 1.

The storage system 2 has a controller 20, a connection interface 27, and physical disk drives 28a to 28e. The physical disk drives 28a to 28e are collectively called physical disk drives 28 in the following description.

The physical disk drives 28 store data and programs used by the host computer 1. The physical disk drives 28 are non-volatile storage media, for example, hard disk drives composed of a magnetic disk and a magnetic head. The connection interface 27 couples the physical disk drives 28 and the controller 20 to each other.

The controller 20 executes processing that is requested by an I/O processing request made by the host computer 1 and controls the physical disk drives 28. The controller 20 has a processor 21, a non-volatile memory 24, a cache memory 26, a physical disk drive adapter 25, a network adapter 22, and a network adapter 23.

The processor 21 executes a given program. The non-volatile memory 24 stores the program executed by the processor 21, information necessary to execute the program, and settings information and configuration information of the storage system 2. The cache memory 26 temporarily stores data input to the storage system 2 by the host computer 1, or data transferred from the storage system 2 to the host computer 1, or data input and output within the storage system 2.

The physical disk drive adapter 25 is coupled to the physical disk drives 28 via the connection interface 27. The network adapter 22 couples the storage system 2 and the network 4. The network adapter 23 couples the storage system 2 and the network 5.

The storage system 2 may have a plurality of controllers 20. Also, the storage system 2 may have two of each of the storage system components including the non-volatile memory 24, the cache memory 26, the physical disk drive adapter 25, and the connection interface 27, for redundancy.

The management terminal 3 is a computer used to manage the configuration of the storage system 2 and to manage the host computer 1 and programs running in the host computer 1. An administrator of the information processing system enters settings information to the management terminal 3 in managing the configuration of the storage system 2 and managing the host computer 1. The management terminal 3 sends the information entered by the administrator to the storage system 2 and the host computer 1 via the network 5. Alternatively, the storage system 2 and the host computer 1 may be managed by different computers.

The management terminal 3 has, though not shown in the drawing, a processor, a memory, local storage, and network adapters as the host computer 1 does. The management terminal 3 also has an input device and a display device which are not shown in the drawing.

The network 4 is used to couple the host computer 1 and the storage system 2 and to transfer I/O and other processing requests from the host computer 1 to the storage system 2. An optical fiber or a copper wire is employed for the network 4. Communication over the network 4 follows small computer system interface (SCSI), transmission control protocol/internet protocol (TCP/IP), or other similar communication protocols.

The network 5 couples the host computer 1, the storage system 2, and the management terminal 3. The network 5 is used to communicate configuration information of the storage system 2 and management information of the host computer 1 among the storage system 2, the host computer 1, and the management terminal 3. The network 5 may employ the same type of cable and the same communication protocol that are employed in the network 5, or the networks 4 and 5 may employ different types of cable and different communication protocols.

Figure 2:
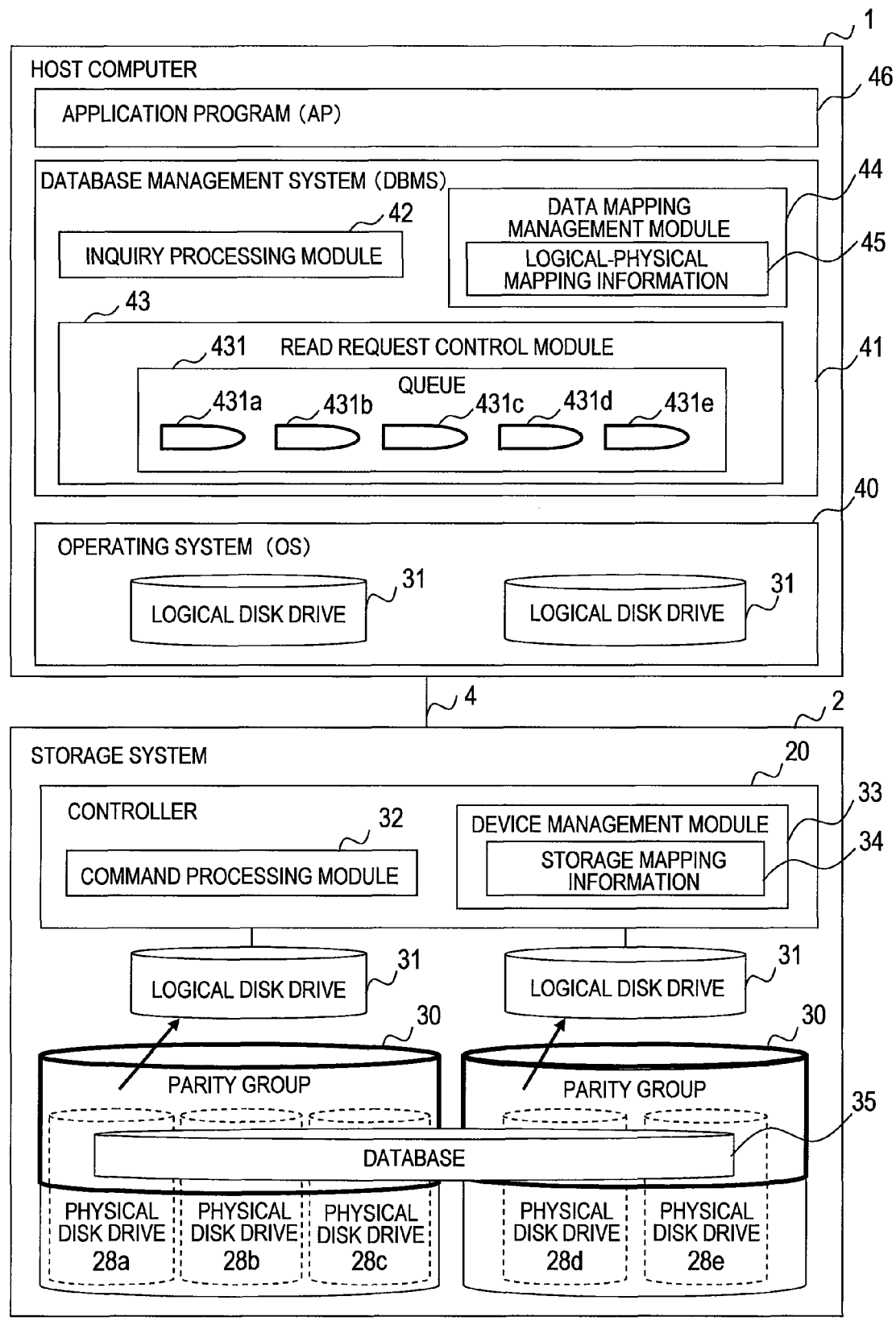
FIG. 2 is a block diagram showing the logical configurations of a host computer and a storage system according to the first embodiment of this invention.

FIG. 2 is a block diagram showing the logical configurations of the host computer 1 and the storage system 2 according to the first embodiment of this invention.

The storage system 2 constructs a parity group 30 (shown by dotted lines in FIG. 2) having redundancy from a single physical disk drive 28 or a combination of physical disk drives 28. Each parity group 30 is a combination of the physical disk drives 28 that store data used by the host computer 1 and the physical disk drives 28 that store parity data created from data at the same location in two or more physical disk drives 28.

The storage system 2 implements a redundant array of independent disks (RAID) configuration, with which data can be restored in the event of failure in the physical disk drives 28, by constructing the parity group 30. Specifically, if a failure occurs in one of the physical disk drives 28 in the parity group 30, data in the failed physical disk drive 28 can be restored from data stored in the remaining working physical disk drives 28 and its associated parity data.

The RAID configuration provided by the parity group 30 may be replaced by a mirroring configuration in which data is written one physical disk drive 28 and simultaneously copied to another physical disk drive 28.

The storage system 2 provides the host computer 1 with logical storage areas as logical disk drives 31. The logical storage areas are in a storage area space that is created from a plurality of physical disk drives 28 constituting the parity group 30.

A database 35 (hereinafter, referred to as "DB 35") is managed by a DBMS 41 which is run in the host computer 1 as will be described later, and is stored in a plurality of physical disk drives 28 via the logical disk drives 31 recognizable to the host computer 1. The DB 35 is composed of tables, indices, and the like.

The controller 20 holds programs that constitute a command processing module 32 and a device management module 33 in the non-volatile memory 24 to control processing of the storage system 2. Processing described below is controlled by executing these programs with the processor 21.

The controller 20 receives an I/O processing request from the host computer 1 via the network adapter 22 to execute the program that constitutes the command processing module 32.

When the received I/O processing request is a data write processing request, the command processing module 32 executes, for example, processing of writing data transferred from the host computer 1 in the cache memory 26 or a given area in the physical disk drives 28.

When the received I/O processing request is a data read processing request, the command processing module 32 executes, for example, processing of reading data out of the cache memory 26 or a given area in the physical disk drives 28 and transferring the read data to the host computer 1.

The controller 20 activates the command processing module 32 and executes requested processing also when the received processing request is not a data read or write request but an inquiry command of a SCSI (a command ordering a device search), for example.

The program that constitutes the device management module 33 is executed by the controller 20 to manage storage mapping information 34. The storage mapping information 34 contains mapping information that shows the association relation between addresses in the logical disk drives 31 and addresses in the physical disk drives 28. Details of the storage mapping information 34 will be described later with reference to FIG. 4.

The controller 20 activates the device management module 33 and processes requests sent from the host computer 1 and the management terminal 3. Specifically, the device management module 33 executes such processing as defining or setting the logical disk drives 31 and transmitting the storage mapping information 34 to meet the requests made by the management terminal 3 and other components.

The controller 20 executes the program that constitutes the device management module 33 also for I/O processing. The device management module 33 calculates from the storage mapping information 34 an address in the physical disk drive 28 that is associated with an address in the logical disk drive 31 in an area specified by an I/O processing request. The controller 20 then accesses the physical disk device 28 at the calculated address.

The controller 20 executes the programs constituting the command processing module 32 and the device management module 33 when there is dynamic data migration within the storage system 2.

Examples of dynamic data migration processing include data relocation processing based on data lifecycle management, which dynamically changes the location of data according to the freshness or importance of the data, data replication processing for making a backup, and processing of restoring data in the physical disk drive 28 where a failure has occurred. Most of these dynamic data migration operations are processed in the background without the host computer 1 being aware of the processing.

When a given condition is met, the controller 20 decides to dynamically migrate data in the storage system 2 that meets the condition. The controller 20 activates the command processing module 32 to read data in the migration source physical disk drive 28 onto the cache memory 26 and to write the read data in the migration destination physical disk drive 28. The controller 20 also activates the device management module 33 to make the storage mapping information 34 reflect a change caused by the data migration. During the data migration, the controller 20 keeps accepting I/O processing requests for all data including the one that is being migrated.

The host computer 1 holds in the memory 11 and the local storage system 12 various programs including an OS 40, the DBMS 41 which manages the DB 35, an AP 46 which issues an inquiry to the DBMS 41, and information necessary to execute the programs. The AP 46 may be run in another computer coupled to the network 5 instead of the host computer 1 where the DBMS 41 is run. In this case, the DBMS 41 receives an inquiry from the AP 46 via the network 5.

The OS 40 handles overall control of the computer including management of the memory 11 and the local storage system 12. The OS 40 of the host computer 1 also recognizes the presence of two logical disk drives 31 provided by the storage system 2 as shown in FIG. 2.

The DBMS 41 is composed of a data mapping management module 44, an inquiry processing module 42, and a read request control module 43.

The data mapping management module 44 constructs and manages logical-physical mapping information 45. The logical-physical mapping information 45 shows the association relation between addresses in the logical disk drives 31 which are recognizable to the OS 40 and addresses in the physical disk drives 28 storing the DB 35 via the logical disk drives 31. Details of the logical-physical mapping information 45 will be described later with reference to FIG. 5.

The inquiry processing module 42 receives an inquiry from the AP 46, executes a plurality of database processing operations relevant to the received inquiry, and sends execution results to the AP 46 in response to the inquiry. The inquiry processing module 42 issues a data read request to the read request control module 43 in the case where a need to read data out of the DB 35 arises during the execution of the database processing.

The read request control module 43 receives a plurality of data read requests from the inquiry processing module 42, and issues data read requests to the storage system 2 via the OS 40.

The DBMS 41 may build a database buffer (DB buffer), which temporarily stores data, in a portion of the memory 11 or the local storage system 12. The data mapping management module 44 having the logical-physical mapping information 45 and the read request control module 43 may run in the OS 40 instead of the DBMS 41.

Described above is the configuration of the first embodiment of this invention. Now, processing of the first embodiment of this invention will be described.

An outline of the processing of the first embodiment of this invention is given first.

The data mapping management module 44 of the host computer 1 makes a request at regular time intervals, or when notified by the storage system 2 of internal dynamic data migration, to the storage system 2 to obtain the storage mapping information 34, and receives the storage mapping information 34 from the storage system 2. The data mapping management module 44 then constructs the logical-physical mapping information 45 in the host computer 1 from the storage mapping information 34 obtained from the storage system 2. The data mapping management module 44 stores the constructed logical-physical mapping information 45 in the memory 11 or other components of the host computer 1.

Based on the logical-physical mapping information 45, the read request control module 43 creates and manages a plurality of queues 431 which are associated with the physical disk drives 28a to 28e constituting the logical disk drives 31, respectively. The queues 431 in the example of FIG. 2 are queues 431a to 431e to match the five physical disk drives 28a to 28e constituting the logical disk drives 31 of the storage system 2. The queues 431a to 431e can be stored in, for example, the memory 11.

The read request control module 43 receives a plurality of data read requests from the inquiry processing module 42, sorts the received requests by their destination, and accumulates the requests in the corresponding queues 431 which are created individually for each of the physical disk drives 28. The read request control module 43 then reallocates the read requests accumulated in the queues 431a to 431e of the respective physical disk drives 28a to 28e into an order that shortens the total data read time of the physical disk drive 28 in question, and issues the requests in the reallocated order to the storage system 2. Specifically, for each of the queues 431a to 431e, the read request control module 43 refers to the logical-physical mapping information 45 to convert logical addresses recognizable to the OS 40 that are contained in the received data read requests into physical addresses (e.g., block addresses), which are managed by the storage system 2 for each the physical disk drives 28a to 28e separately. The read request control module 43 reallocates data read requests in one of the queues 431a to 431e based on their physical addresses, and repeats this for the remaining queues 431. The reallocation of data read requests based on their physical addresses can employ a known method as the one mentioned in the above conventional example, and data read requests are reallocated into an order that minimizes the magnetic head seek time and magnetic rotational latency of each of the physical disk drives 28.

The DBMS 41 can thus issue data read requests in an optimum order for each of the physical disk devices 28a to 28e in the presence of changes in data location due to dynamic data migration within the storage system.

The description will be given of details of the processing and data configuration in the first embodiment of this invention.

Figure 3:
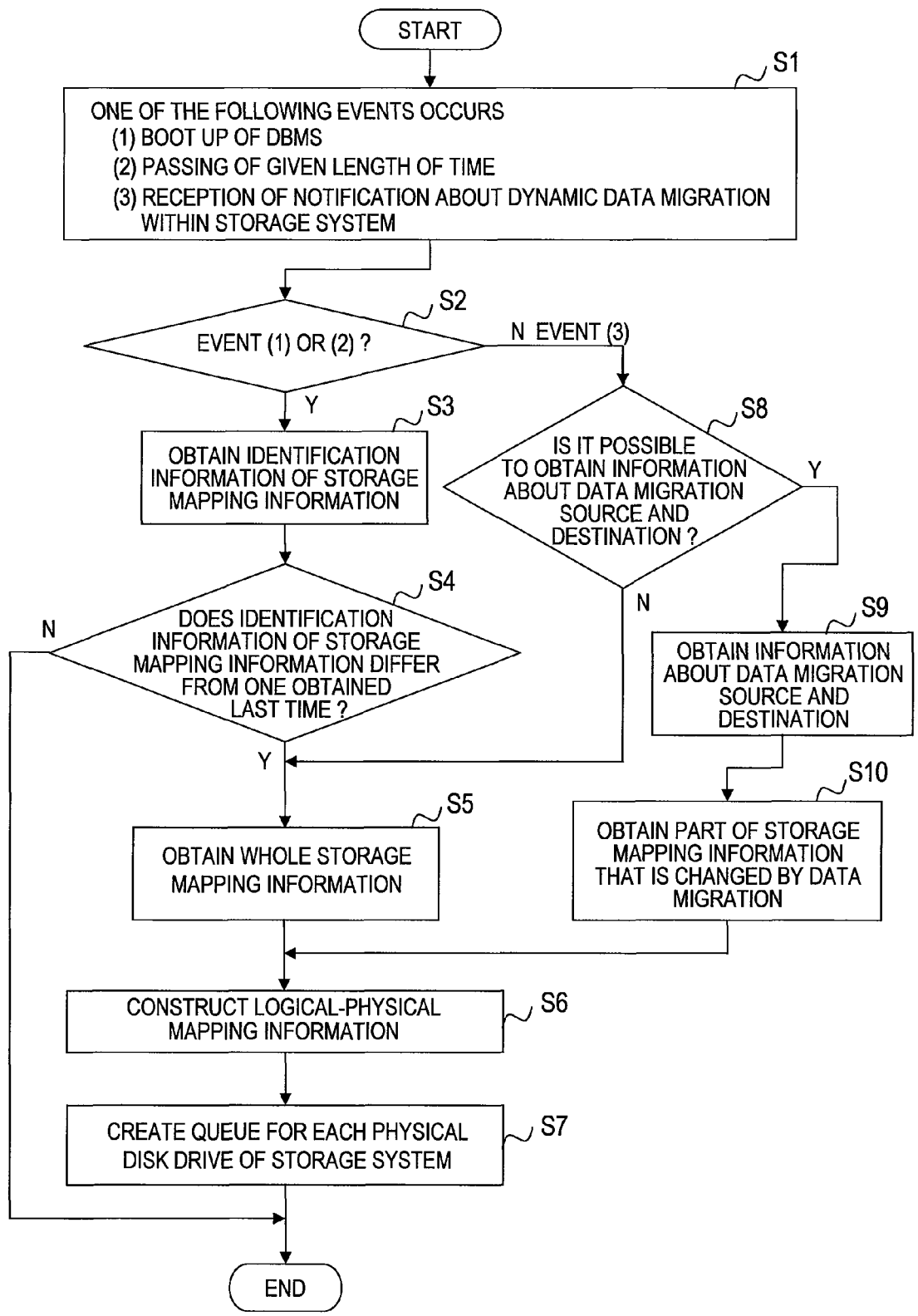
FIG. 3 is a flow chart showing steps of logical-physical mapping information constructing processing which is executed by a data mapping management module according to the first embodiment of this invention.

FIG. 3 is a flow chart showing steps of processing that is executed by the data mapping management module 44 to construct the logical-physical mapping information 45 according to the first embodiment of this invention.

The data mapping management module 44 of the DBMS 41 waits until at least one of Events (1) to (3) occurs (S1). Event (1) is boot of the DBMS 41. Event (2) is the passing of a given length of time. Event (3) is reception of a notification from the storage system 2 or the management terminal 3 about dynamic data migration within the storage system 2. The given length of time in Event (2) is stored in the memory 11 or the local storage system 12, and can be set to a desired value by an administrator of the DBMS 41 (hereinafter, referred to as "DB administrator") through the management terminal 3 or other computers.

When one of the above-described Events (1) to (3) occurs, the data mapping management module 44 judges which event has occurred (S2). In other words, the data mapping management module 44 takes the processing to Step S2 when a given condition is met.

In the case where it is Event (1) or Event (2) that has occurred (the answer to S2 is "Y"), the data mapping management module 44 makes a request to the storage system 2 to obtain identification information of the storage mapping information 34. The identification information of the storage mapping information 34 contains, for example, last update date/time information, version information, and checksum information. These identification information pieces are updated when the storage mapping information 34 is changed. The version information can be serial values managed by the storage system 2.

The controller 20 of the storage 2 system receives the request from the DBMS 41 of the host computer 1, and sends the identification information of the storage mapping information 34 to the host computer 1. The data mapping management module 44 thus obtains the identification information of the storage mapping information 34 (S3).

The data mapping management module 44 judges whether or not the obtained identification information of the storage mapping information 34 differs from identification information that has been obtained last time and has been stored since then in the memory 11 or the local storage system 12 (S4). The data mapping management module 44 thereby judges whether or not a change has been made to the storage mapping information 34. After making a judgment, the data mapping management module 44 stores the identification information of the storage mapping information 34 in the memory 11 or the local storage system 12 for the next time Step S4 is executed.

When it is judged that the identification information of the storage mapping information 34 is the same as the identification information obtained last time (the answer to S4 is "N"), the data mapping management module 44 judges that the storage mapping information 34 has not been changed, which means that there has been no change in location of data within the storage system 2, and ends the processing. At this point, the read request control module 43 can execute Step S7 which will be described later, to create the queues 431 individually for each of the physical disk drives 28, in the case where it is Event (1) (booting up of the DB) that has occurred and the queues 431 of the respective physical disk drives 28 have not been created yet.

When it is judged that the identification information of the storage mapping information 34 differs from the identification information obtained last time (the answer to S4 is "Y"), the data mapping management module 44 makes a request to the storage system 2 to obtain the whole storage mapping information 34. The controller 20 of the storage system 2 receives this request and sends the storage mapping information 34 in its entirety to the host computer 1. The data mapping management module 44 thus obtains the updated whole storage mapping information 34 (S5). The data mapping management module 44 may obtain the entire storage mapping information 34 at once, or may obtain a portion of the storage mapping information 34 at a time. The data mapping management module 44 stores the obtained storage mapping information 34 in the memory 11 or the local storage system 12.

In the case where it is Event (3) that has occurred (the answer to S2 is "N"), the data mapping management module 44 judges whether or not information about the data migration source and destination in the storage system 2 can be obtained (S8). To give a specific example, the data mapping management module 44 judges whether or not the received data migration notification contains information about the data migration source and destination.

When it is judged that information about the data migration source and destination cannot be obtained (the answer to S8 is "N"), the data mapping management module 44 proceeds to Step S5 to obtain the whole storage mapping information 34.

When it is judged that information about the data migration source and destination can be obtained (the answer to S8 is "Y"), the data mapping management module 44 obtains the information about the data migration source and destination (S9). For example, the data mapping management module 44 obtains, from the received data migration notification, identification information of the data migration source physical disk drive 28 and the data migration destination physical disk drive 28, access destination addresses in the physical disk drives 28, and information containing the size of the migrating data.

The data mapping management module 44 uses the obtained information about the data migration source and destination in making a request to the storage system 2 to obtain a part of the storage mapping information 34 that is changed as a result of the data migration. The request to obtain a part of the storage mapping information 34 contains, for example, the identification information of the physical disk drives 28 and the address ranges of the physical disk drives 28 to specify which part is to be obtained. The controller 20 of the storage system 2 receives the request and sends the requested partial information of the storage mapping information 34 to the host computer 1. The data mapping management module 44 thus obtains a part of the storage mapping information 34 that is changed as a result of the data migration (S10). The data mapping management module 44 may obtain the desired part the storage mapping information 34 all at once, or may obtain a portion the storage mapping information 34 at a time.

From the storage mapping information 34 obtained in Step S5 or S10, the data mapping management module 44 constructs the logical-physical mapping information 45, which associates addresses in the logical disk drives 31 accessed by the DBMS 41 and addresses in the physical disk drives 28 in the storage system 2 (S6). In the case where the obtained storage mapping information 34 is partial information of Step S10, the data mapping management module 44 updates only the corresponding part of the logical-physical mapping information 45.

The data mapping management module 44 notifies the read request control module 43 of the update of the logical-physical mapping information 45. The read request control module 43 uses the logical-physical mapping information 45 to create the queues 431a to 431e corresponding to the physical disk drives 28a to 28e constituting the logical disk drives 31, respectively, and the processing is then ended (S7). In the case where the logical-physical mapping information 45 is partially changed in Step S6, the read request control module 43 updates only the queues 431 of the physical disk drives 28 that are relevant to the change.

In the case where data read requests that are relevant to the data migration have already been accumulated in the queues 431, the read request control module 43 can remove the relevant read requests out of the queue 431 that is associated with the migration source physical disk drive 28 and newly put the removed requests in the queue 431 that is associated with the migration destination physical disk drive 28, if it is before the read requests are issued.

As described above, the data mapping management module 44 first reads identification information of the storage mapping information 34 of the storage system 2 and compares the read identification information against the last identification information stored in the memory 11 or other components of the host computer 1, thereby judging whether or not the storage system 2 has gone through a data update or data migration. The data mapping management module 44 obtains the storage mapping information 34 only when data placement in the storage system 2 is updated. This prevents data transferred between the host computer 1 and the storage system 2 from reaching an excessive amount. The prevention of excessive increase in amount of data transferred between the host computer 1 and the storage system 2 works also when there is data migration within the storage system 2 by making the data mapping management module 44 obtain only the changed part of the storage mapping information 34.

FIG. 4 is a diagram showing an example of the storage mapping information 34 according to the first embodiment of this invention. The storage mapping information 34 contains in each record entry a host logical disk drive number 49, a host logical disk drive internal address 50, a logical disk drive number 51, a logical disk drive internal address 52, a physical disk drive number 53, a physical disk drive internal address 54, and a parity group number 55.

The host logical disk drive number 49 indicates a number used to identify each logical disk drive 31 provided to the host computer 1. The host logical disk drive internal address 50 indicates an address within the logical disk drive 31 that is identified by the host logical disk drive number 49, and the address is a logical address at which the host computer 1 accesses the logical disk drive 31.

The logical disk drive number 51 indicates a number for unitary management in the storage system 2 of the logical disk drive 31 identified by the host logical disk drive number 49. The logical disk drive internal address 52 indicates an address within the logical disk drive 31 that is identified by the logical disk drive number 51, and the address is an internal address in the storage system 2.

The physical disk drive number 53 indicates an identification number that is assigned to each physical disk drive 28 constituting a logical storage area that is identified by the logical disk drive number 51 and the logical disk drive internal address 52. The physical disk drive internal address 54 indicates an address within the physical disk drive 28 that is identified by the physical disk drive number 53.

The parity group number 55 indicates a number for identifying the parity group 30 to which the physical disk drive 28 that is identified by the physical disk drive number 53 belongs.

The storage mapping information 34 thus holds the association relation between addresses in the logical disk drives 31 provided to the host 1 and addresses in the physical disk drives 28 constituting the logical disk drives 31.

How the storage mapping information 34 is changed as a result of dynamic data migration will be described. Examples of the change are shown in brackets in records of FIG. 4. Take an example in which data indicated by a logical disk drive number "01", a logical disk drive internal address "64K~128K", a physical disk drive number "01", a physical disk drive internal address "0~64K", and a parity group number "00" migrates internally to a storage area indicated by a logical disk drive number "03", a logical disk drive internal address "64K~128K", a physical disk drive number "20", a physical disk drive internal address "64K~128K", and a parity group number "02". The device management module 33 updates this record (second from the top in FIG. 4) such that the logical disk drive number 51 is changed from "01" to "03", the logical disk drive internal address 52 is changed from "64K~128K" to "64K~128K", the physical disk drive number 53 is changed from "01" to "20", the physical disk drive internal address 54 is changed from "0~64K" to "64K~128K", and the parity group number 55 is changed from "00" to "02". In this example, the device management module 33 does not change the host logical disk drive number 49 and the host logical disk drive internal address 50 because this physical data migration is dynamic migration within the storage system 2 which the host computer 1 is not aware of.

Figure 5:
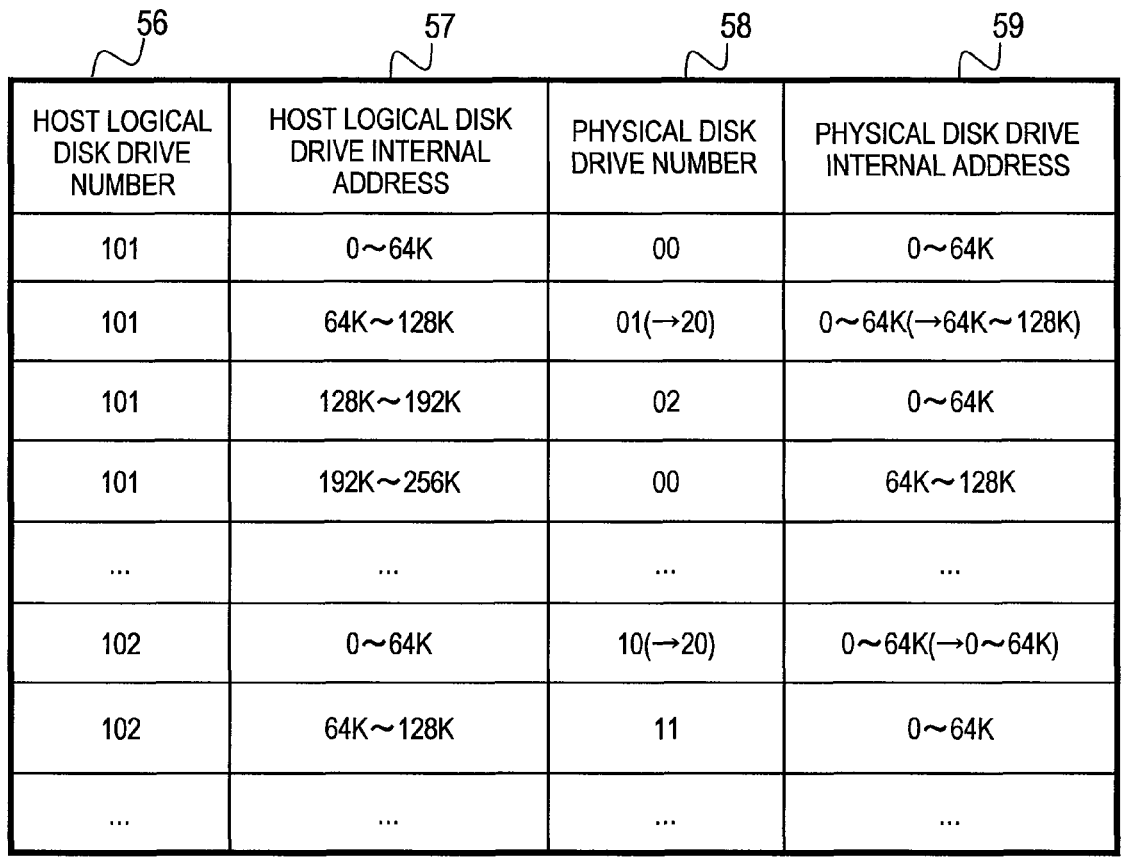
FIG. 5 is a diagram showing an example of logical-physical mapping information according to the first embodiment of this invention.

FIG. 5 is a diagram showing an example of the logical-physical mapping information 45 according to the first embodiment of this invention. The logical-physical mapping information 45, which is kept by the DBMS 41 of the host computer 1, contains in each record entry a host logical disk drive number 56, a host logical disk drive internal address 57, a physical disk drive number 58, and a physical disk drive internal address 59.

The host logical disk drive number 56 indicates a number used in the host computer 1 to identify each logical disk drive 31 recognizable to the host computer 1. The host logical disk drive number 56 corresponds to the host logical disk drive number 49 in the storage mapping information 34 of FIG. 4, and the two may hold the same value. The host logical disk drive internal address 57 indicates an address used in the host computer 1 for the host logical disk drive 31 that is identified by the host logical disk drive number 56. The host logical disk drive internal address 57 corresponds to the host logical disk drive internal address 50 of FIG. 4, and the two may hold the same value.

The physical disk drive number 58 indicates an identification number that is assigned to each physical disk drive 28 constituting a logical storage area in the host computer 1 that is identified by the host logical disk drive number 56 and the host logical disk drive internal address 57, and corresponds to the physical disk drive number 53 of FIG. 4. The physical disk drive internal address 59 indicates an address in the physical disk drive 28 that constitutes the above logical storage area in the host computer 1, and corresponds to the physical disk drive internal address 54 of FIG. 4.

The logical-physical mapping information 45 thus holds the association relation between addresses in the logical disk drives 31 in the host computer 1 and addresses in the physical disk drives 38 constituting the logical disk drives 31.

A brief description will be given on how the logical-physical mapping information 45 is changed when the data mapping management module 44 of the DBMS 41 obtains the storage mapping information 34 changed as a result of dynamic data migration within the storage system 2. For example, in the case where the obtained storage mapping information 34 has been changed as shown in brackets in the records of FIG. 4, the logical-physical mapping information 45 is changed as shown in brackets in records of FIG. 5. The DBMS 41 can thus keep track of a change in physical data location which results from dynamic data migration within the storage system 2.

Figure 6:
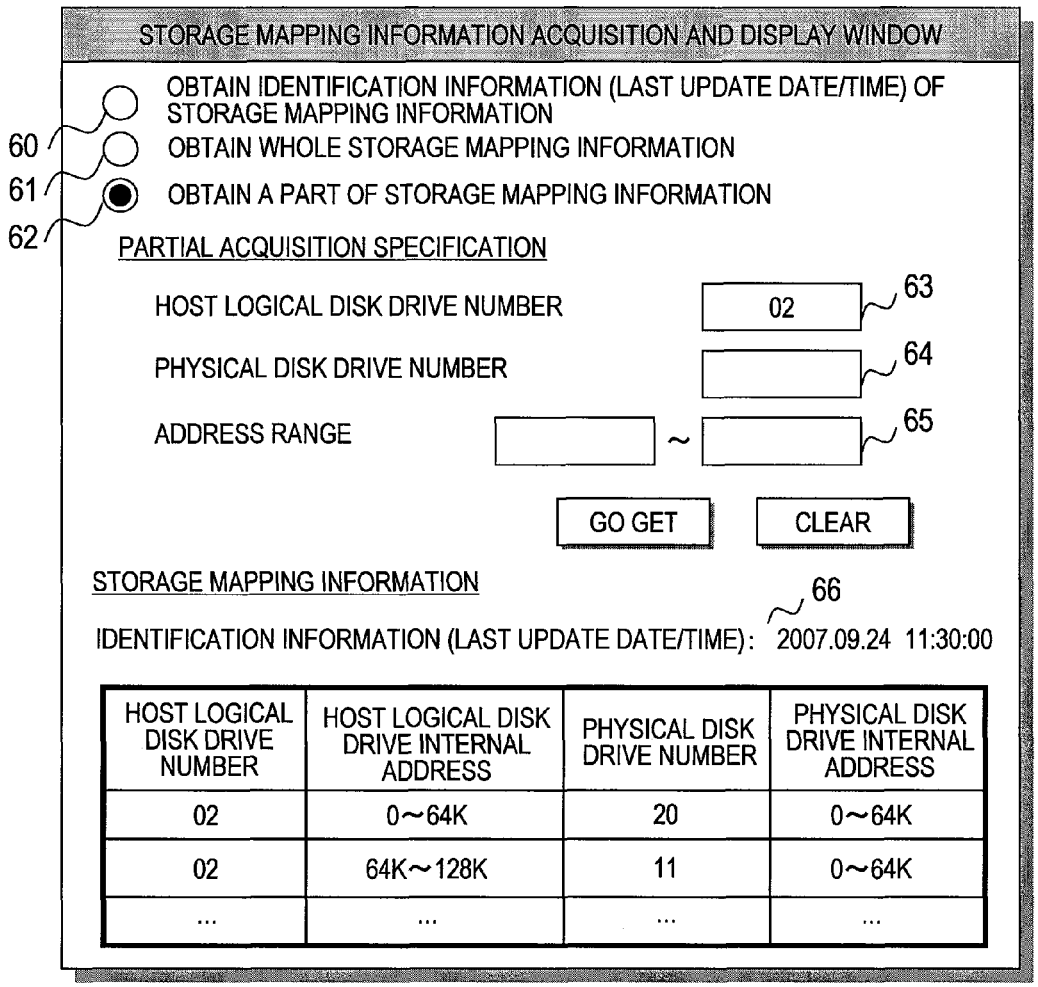
FIG. 6 is a screen image showing an example of a storage mapping information acquisition and display window according to the first embodiment of this invention.

FIG. 6 is a diagram showing an example of a storage mapping information 34 acquisition and display window displayed on the management terminal 3 or other computers according to the first embodiment of this invention. This window is a user interface for obtaining the storage mapping information 34 of the storage system 2, and is displayed on the host computer 1 or the management terminal 3 by the controller 20. Alternatively, the controller 20 may provide an interface for obtaining the storage mapping information 34 in a command line format.

Using this window, the DB administrator operating the management terminal 3 (or the host computer 1) can make a request to the storage system 2 to obtain the storage mapping information 34 that meets a desired condition, and have the DBMS 41 obtain the storage mapping information 34. Specifically, checking a checkbox 60 and then operating a "go get" button make the DBMS 41 obtain identification information (for example, the last update time/date) of the storage mapping information 34.

The DB administrator can have the DBMS 41 obtain the whole storage mapping information 34 by checking a checkbox 61 and then operating the "go get" button.

When the DB administrator checks a checkbox 62, enters a desired value in one of text input fields 63, 64, and 65, and then operates the "go get" button, the DBMS 41 obtains a part of the storage mapping information 34 that is specified by the entered value. In the text input fields 63, 64, and 65, a desired host logical disk drive number, a desired physical disk drive number, and a desired logical or physical disk drive address range are entered, respectively. The DB administrator can delete values from the text input fields 63, 64, and 65 by operating a "clear" button.

The controller 20 may display the obtained storage mapping information 34 in a display section 66 of the window. Also, the controller 20 may display a text input field for entering a parity group number in addition to the input text fields 63, 64, and 65, so that the storage mapping information 34 that is specified by values entered in all those text input fields is sent to the DBMS 41.

Figure 7:
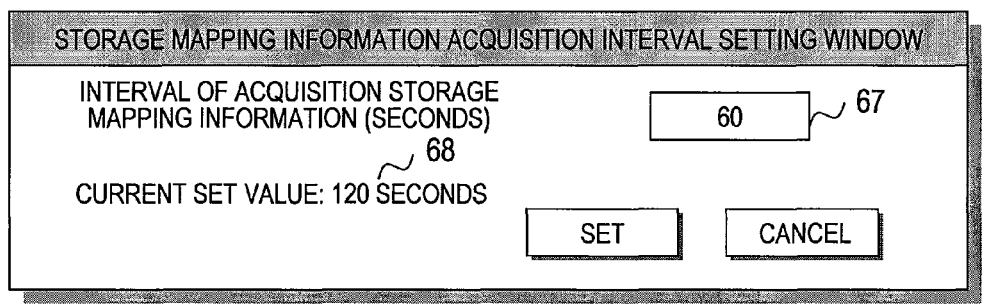
FIG. 7 is a screen image showing an example of a storage mapping information acquisition time interval setting window according to the first embodiment of this invention.

FIG. 7 is a diagram showing an example of a window that is used to set a time interval at which the storage mapping information 34 is obtained according to the first embodiment of this invention. This window is a user interface for setting a time interval at which the storage mapping information 34 is obtained, and is displayed on the host computer 1 or the management terminal 3 by the DBMS 41. Alternatively, the DBMS 41 may provide an interface for setting a time interval at which the storage mapping information 34 is obtained in a command line format.

The DB administrator operating the management terminal 3 (or the host computer 1) enters a desired time interval in a text input field 67 and then operates a "set" button, to thereby have the DBMS 41 set the entered value as the time interval at which the storage mapping information 34 is obtained. The DBMS 41 may display the current time interval at which the storage mapping information 34 is obtained in a display section 68 of the window.

Figure 8:
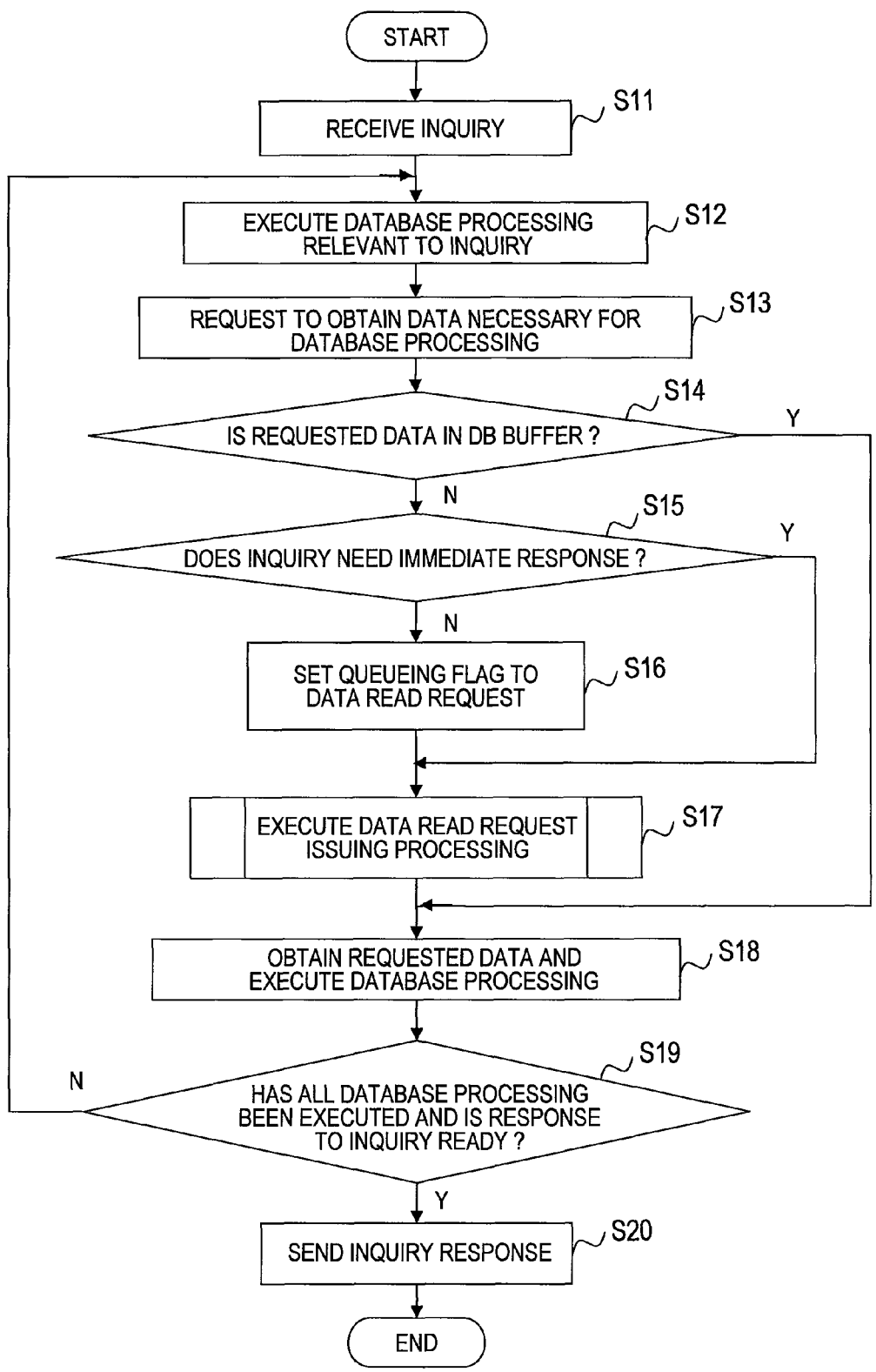
FIG. 8 is a flow chart showing steps of processing that is executed by an inquiry processing module according to the first embodiment of this invention.

FIG. 8 is a flow chart showing steps of processing that is executed by the inquiry processing module 42 according to the first embodiment of this invention. This processing is executed when the DBMS 41 receives an inquiry from the AP 46.

The inquiry processing module 42 of the DBMS 41 receives an inquiry from the AP 46 (S11), and executes a plurality of database processing operations (or a single database processing operation) relevant to the received inquiry (S12). An inquiry from the AP 46 is made in, for example, structured query language (SQL).

While executing the database processing, the inquiry processing module 42 makes a request to obtain data of the DB 35 as the need arises (S13).

The inquiry processing module 42 accesses the DB buffer to judge whether or not the requested data is found in the DB buffer for some reason, such as being read out of the storage system 2 onto the DB buffer in the past and remaining since then (S14).

When it is judged that the requested data is in the DB buffer (the answer to S14 is "Y"), the inquiry processing module 42 obtains the data from the DB buffer and executes the database processing (S18).

When it is judged that the requested data is not in the DB buffer (the answer to S14 is "N"), the inquiry processing module 42 judges from the specifics of the database processing to be executed or from the performance requirement for responding to the inquiry whether or not the inquiry needs to be responded immediately (S15). To give a specific example to illustrate the performance requirement for responding to an inquiry, a fast response is requested in the case of online transaction processing (OLTP) whereas the response speed can be slower in the case of online analytical processing (OLAP).

When it is judged that the inquiry does not need an immediate response (the answer to S15 is "N"), the inquiry processing module 42 creates a necessary data read request and sets a queueing flag to the read request (S16). A queueing flag attached to a read request is an identifier for storing the read request in one of the queues 431. The inquiry processing module 42 issues the data read request to the read request control module 43, and the read request control module 43 executes data read request issuing processing (S17). Details of the data read request issuing processing will be described later with reference to FIG. 9. The data read request issued by the inquiry processing module 42 contains the identifier number of and address in the logical disk drive 31 that is accessed by the DBMS 41.

When it is judged that the inquiry needs an immediate response (the answer to S15 is "Y"), the inquiry processing module 42 issues a data read request to the read request control module 43 without setting a queueing flag to the read request (S17).

The inquiry processing module 42 waits until data requested by the read request is read out of the storage system 2 via the OS 40. Once the requested data is read, the inquiry processing module 42 stores the data in the DB buffer and executes the database processing (S18). The inquiry processing module 42 may return to Step S12 to execute another database processing operation while waiting for the requested data to be read.

The inquiry processing module 42 then judges whether or not all of the database processing operations relevant to the received inquiry have been executed (S19). When any of the data base processing operations is yet to be executed (the answer to S19 is "N"), the inquiry processing module 42 returns to S12 to repeat the subsequent steps.

When it is judged that the relevant database processing operations have all been executed and the generation of a response to the inquiry is finished (the answer to S19 is "Y"), the inquiry processing module 42 sends the generated response to the inquiry to the AP 46, and ends the processing (S20).

In the above processing, of read requests created by the DBMS 41, ones that do not need to be responded immediately are stored in the queues 431 first and then processed, whereas ones that need to be responded immediately are processed without being stored in the queues 431.

Figure 9:
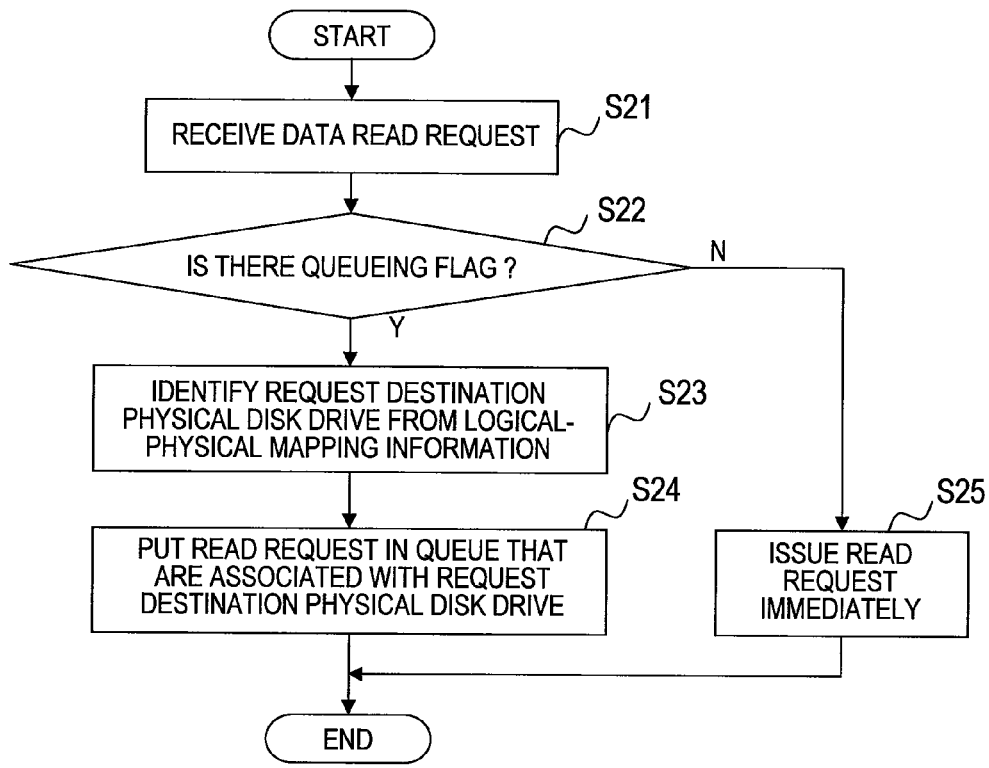
FIG. 9 is a flow chart showing steps of data read request issuing processing according to the first embodiment of this invention.

FIG. 9 is a flow chart showing steps of data read request issuing processing according to the first embodiment of this invention. This flow chart illustrates the processing executed in Step S17 of FIG. 8.

The read request control module 43 of the DBMS 41 receives a data read request from the inquiry processing module 42 (S21), and judges whether or not there is a queueing flag set to the request (S22).

When it is judged that the received data read request does not have a queueing flag set thereto (the answer to S22 is "N"), the read request control module 43 immediately issues the data read request to the storage system 2 using OS system call, and then ends the processing (S25).

When it is judged that there is a queueing flag set to the received data read request (the answer to S22 is "Y"), the read request control module 43 determines which one of the physical disk drives 28a to 28e is the destination of the data read request, based on the identification number of and address in the logical disk drive 31 that are specified in the data read request and the logical-physical mapping information 45 (S23).

The read request control module 43 puts the received data read request in one of the queues 431a to 431e that are associated with one of the physical disk drives 28a to 28e that has been determined as the destination of the data read request, and then ends the processing (S24). The data read request can be put in any place in the queue 431.

After the read request control module 43 finishes the data read request issuing processing of FIG. 9, the inquiry processing module 42 takes over to resume its own processing.

Figure 10:
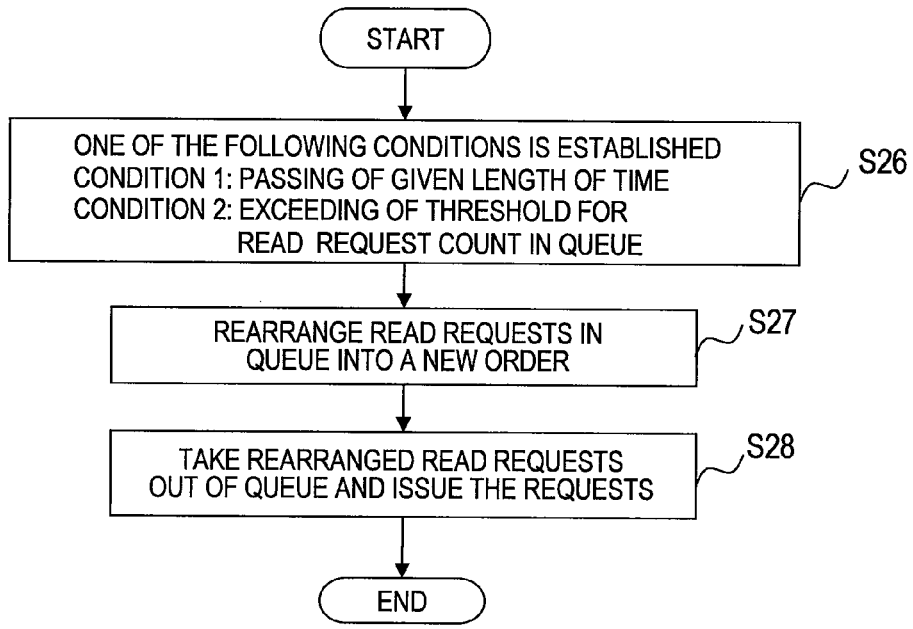
FIG. 10 is a flow chart showing steps of processing that is executed to issue data read requests accumulated in a queue according to the first embodiment of this invention.

FIG. 10 is a flow chart showing steps of processing of issuing accumulated data read requests according to the first embodiment of this invention. This processing is executed periodically by the read request control module 43.

The read request control module 43 waits for each of the queues 431*a* to 431*e* respectively associated with the plurality of physical disk drives 28*a* to 28*e* to meet Condition 1 or Condition 2 (S26). Condition 1 is the passage of a given length of time. Condition 2 is the exceeding of a threshold set for the read request count in each queue 431. The given length of time and the threshold in Condition 1 and Condition 2 are stored in the memory 11 or the local storage system 12 in advance, and set to desired values by the DB administrator through the management terminal 3 or other computers.

When the above-described Condition 1 or Condition 2 is met by the queue 431 that is associated with one physical disk drive 28, the read request control module 43 reallocates a plurality of read requests accumulated in this queue 431 into an order that shortens the total data read time of the queue's associated physical disk drive 28 (S27). Specifically, based on the identification number of and address in the logical disk drive 31 that are contained in the read request and the logical-physical mapping information 45, the read request control module 43 identifies physical addresses in the physical disk drive 28 from which the requested data is read, and reallocates the plurality of read requests in the queue 431 according to the identified physical addresses. The reallocating can employ a known method as mentioned above.

The read request control module 43 takes the plurality of reallocated read requests out of the queue 431 to issue the read requests to the storage system 2 via the OS 40, and then ends the processing (S28).

The read request control module 43 can thus issue data read requests in an optimum order for each of the physical disk drives 28*a* to 28*e*. This enables the DBMS 41 to issue data read requests in an optimum order despite the ever-changing physical data location of the storage system 2, and the inquiry time can be shortened and stabilized.

A brief, specific example will be given to describe the request reallocating processing of Step S27. In the example given here, three read requests that request to access the physical disk drive 28*a* at addresses "1", "2" and "3", respectively, are accumulated in the queue 431*a* which is associated with the physical disk drive 28*a* in an order in which the read requests have been received. The read request control module 43 reallocates these three requests in the queue 431*a* in, for example, ascending order of address: "1", "2", "3". The read request control module 43 then issues the three requests in the new order to the storage system 2. As a result, physically continuous areas in the physical disk drive 28*a* can be accessed sequentially, and the rotational latency and the seek time in reading data out of the physical disk drive 28*a* (e.g., a hard disk drive) are accordingly minimized.

Figure 11:
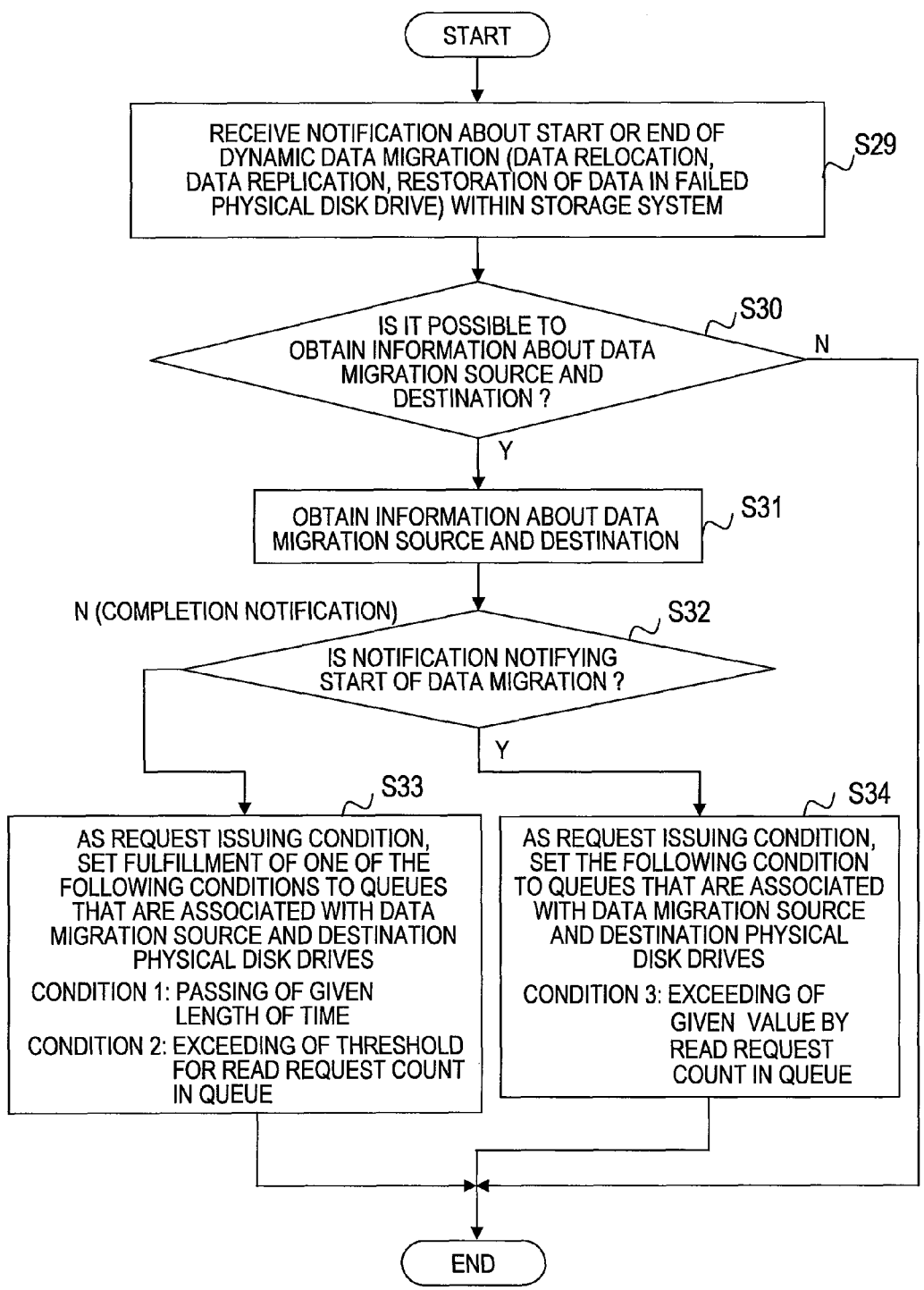
FIG. 11 is a flow chart showing steps of processing that is executed to change read request issuing conditions upon reception of a notification of the start or end of dynamic data migration according to the first embodiment of this invention.

FIG. 11 is a flow chart showing steps of processing that is executed to change read request issuing conditions upon reception of a notification of the start or end of dynamic data migration according to the first embodiment of this invention. This processing is executed by the data mapping management module 44 of the DBMS 41.

This processing partially overlaps with a part of the logical-physical mapping information constructing processing of FIG. 3 that is executed when it is Event (3) that has occurred. Therefore, this processing may be executed in parallel with the part of the logical-physical mapping information constructing processing of FIG. 3 that is executed upon Event (3).

The data mapping management module 44 of the DBMS 41 receives from the storage system 2 or the management terminal 3 a notification about the start or end of dynamic data migration within the storage system 2 (S29), and judges whether or not information can be obtained about the source and destination of the dynamic data migration within the storage system 2 (S30).

When it is judged that information about the data migration source and destination cannot be obtained (the answer to S30 is "N"), the data mapping management module 44 ends the processing.

When it is judged that information about the data migration source and destination can be obtained (the answer to S30 is "Y"), the data mapping management module 44 obtains the information about the data migration source and destination from the storage system 2 (S31). For example, from a notification sent by the storage system 2 and notifying the start of data migration, the data mapping management module 44 obtains identification information of the data migration source physical disk drive 28 and the data migration destination physical disk drive 28, access destination addresses in the physical disk drives 28, and information containing the size of the migrating data.

Steps S30 and S31 correspond to Steps S8 and S9 in the logical-physical mapping information constructing processing of FIG. 3 which are executed when it is Event (3) that has occurred, respectively.

The data mapping management module 44 judges whether the received notification is about the start of data migration or the end of data migration (S32).

When the received notification is judged as a notification of the start of data migration (the answer to S32 is "Y"), the data mapping management module 44 instructs the read request control module 43 to change the current read request issuing condition of the queues 431 (some of the queues 431*a* to 431*e* in this example) that are associated with the data migration source and destination physical disk drives 28 (some of the physical disk drives 28*a* to 28*e* in this example). The read request control module 43 sets Condition 3 as the read request issuing condition of the queues 431 (some of the queues 431*a* to 431*e* in this example) that are associated with the data migration source and destination physical disk drives 28 (some of the physical disk drives 28*a* to 28*e* in this example) in accordance with the instruction given by the data mapping management module 44 (S34). The processing is then ended. Condition 3 is the exceeding of a given value set for the read request count in each queue 431.

In other words, the read request control module 43 cancels the condition "fulfillment of Condition 1 or Condition 2", which is the request issuing condition in the accumulated data read request issuing processing of FIG. 10 only from the queues 431 (some of the queues 431*a* to 431*e* in this example) that are associated with the migration source and destination physical disk drives 28 (some of the physical disk drives 28*a* to 28*e* in this example), and newly sets Condition 3 to these queues 431. The given value in Condition 3 is stored in the memory 11 or the local storage system 12, and can be set to a desired value by the DB administrator. The given value in Condition 3 can be set to a value larger than the threshold in Condition 2.

When the notification received from the storage system 2 is judged as a notification of the end of data migration, on the other hand (the answer to S32 is "N"), the data mapping management module 44 instructs the read request control module 43 to change the current read request issuing condition of the queues 431 (some of the queues 431*a* to 431*e* in this example) that are associated with the data migration source and destination physical disk drives 28 (some of the physical disk drives 28*a* to 28*e* in this example) back to the original request issuing condition. The read request control module 43 sets the condition "fulfillment of Condition 1 or Condition 2" of FIG. 10 as the read request issuing condition of the queues 431 (some of the queues 431a to 431e in this example) that are associated with the data migration source and destination physical disk drives 28 (some of the physical disk drives 28a to 28e in this example) (S33). The processing is then ended. The read request control module 43 may execute Step S33 when a given length of time elapses without receiving a notification about the end of data migration.

Types and access characteristics of dynamic data migration within the storage system 2 will be described. Examples of types of dynamic data migration processing included, as mentioned above, data relocation processing based on data life-cycle management, which dynamically changes the location of data according to the freshness or importance of the data, data replication processing for making a backup, and processing of restoring data in the physical disk drive 28 where a failure has occurred. Access characteristics of these dynamic data migration operations are, in most cases, sequential read and sequential write in which continuous physical areas are accessed.

Through the read request issuing condition changing processing of FIG. 11, the read request control module 43 accumulates data read requests destined to the physical disk drives 28 that are involved in dynamic data migration while the storage system 2 is executing the dynamic data migration, until the count of accumulated data read requests reaches a maximum value permitted by the DB administrator (the given value), and then issues the accumulated requests at once. This way, dynamic data migration within the storage system 2 which is sequential access can be executed preferentially while the read request control module 43 is accumulating requests. Also, a given number of accumulated requests can be processed in a minimum data read time. In short, the processing of FIG. 11 optimizes data read processing of the physical disk drives 28 that are relevant to dynamic data migration (some of the physical disk drives 28a to 28e in this example) during the dynamic data migration.

Figure 12:
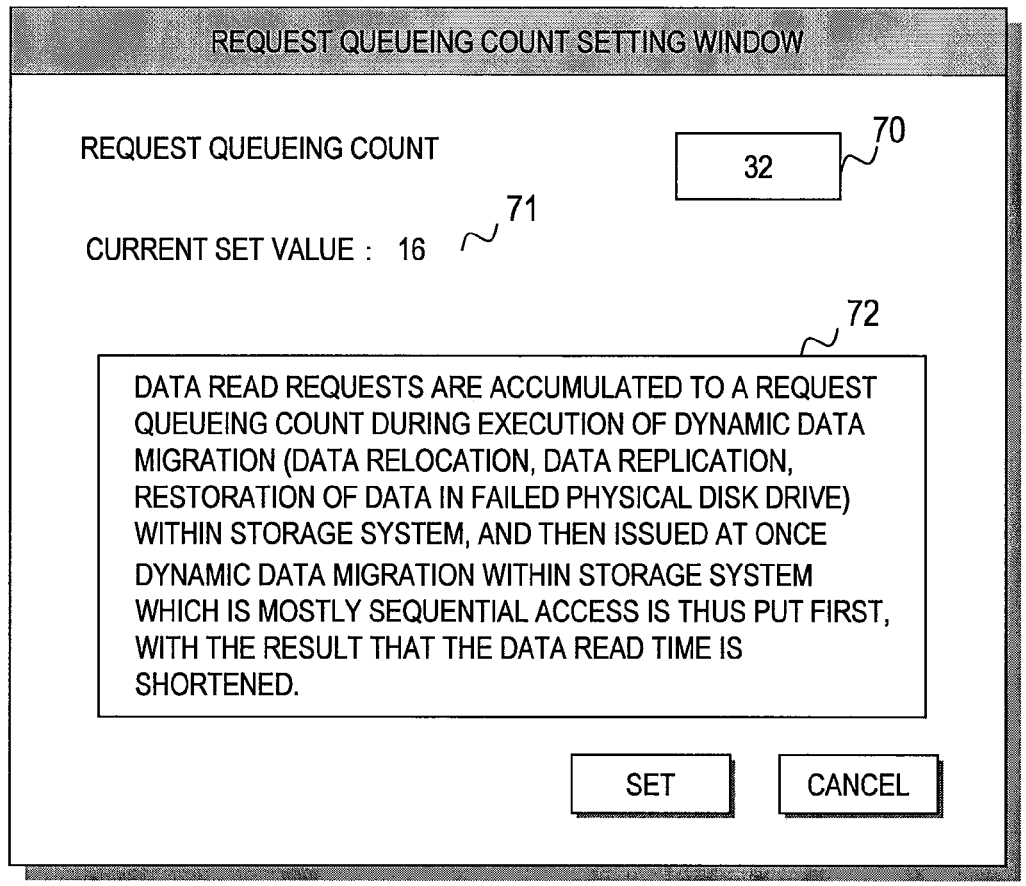
FIG. 12 is a screen image showing an example of a request queueing count setting window according to the first embodiment of this invention.

FIG. 12 is a diagram showing an example of a request queueing count setting window according to the first embodiment of this invention. The request queueing count is the given value in Condition 3 in the read request issuing condition changing processing of FIG. 11.

This window is a user interface for setting the request queueing count, and is displayed on the host computer 1 or the management terminal 3 by the DBMS 41. Alternatively, the DBMS 41 may provide an interface for setting the request queueing count in a command line format.

The DB administrator operating the management terminal 3 (or the host computer 1) enters a desired numerical value in a text input field 70 and then operates a "set" button, to thereby have the DBMS 41 set the entered value as the request queueing count.

The DBMS 41 may display the current request queueing count in a display section 71 of the window. The DBMS 41 may also display in a display section 72 a function and an effect that are obtained as a result of setting the request queueing count. For instance, as shown in FIG. 12, a message to the effect that data read requests are accumulated during the execution of dynamic data migration within the storage system 2 until the queueing request count is reached and are issued at once may be displayed as the function, whereas a message to the effect that the data read time is cut short as a result of putting dynamic data migration within the storage system 2 which is sequential access first is displayed as the effect.

As has been described, according to the first embodiment of this invention, the DBMS 41 obtains from the storage system 2 partial of whole storage mapping information 34, whichever is appropriate, to construct the logical-physical mapping information 45 and create the queues 431a to 431e associated with the plurality of physical disk drives 28a to 28e in the storage system 2, respectively. A plurality of data read requests are accumulated in the respective queues 431a to 431e of the request destination physical disk drives 28a to 28e, and the accumulated read requests are reallocated into an order that shortens the total data read time in each of the physical disk drives 28a to 28e, before being issued to the storage system 2. The DBMS 41 can thus issue data read requests in an optimum order suited to the ever-changing physical data location in the storage system 2, and the inquiry time is accordingly shortened and stabilized.

Further, since the first embodiment of this invention sets a request issuing condition individually for each of the queues 431a to 431e associated with the plurality of physical disk drives 28a to 28e, respectively, an unbalancingly large load on some of the physical disk drives 28a to 28e can be balanced among all of the physical disk drives 28a to 28e by issuing requests to other light-load physical disk drives 28.

Second Embodiment

A second embodiment of this invention will be described below. The description will focus on the differences from the first embodiment of this invention, and components that provide the same functions as the components in the first embodiment of this invention will be denoted by the same reference symbols in order to omit repetitive descriptions.

The first embodiment describes a mode of applying this invention to an information processing system that allows dynamic data migration within the storage system 2. The second embodiment describes a mode of applying this invention to an information processing system that allows dynamic data migration within the OS 40 of the host computer 1 in addition to one within the storage system 2.

Figure 13:
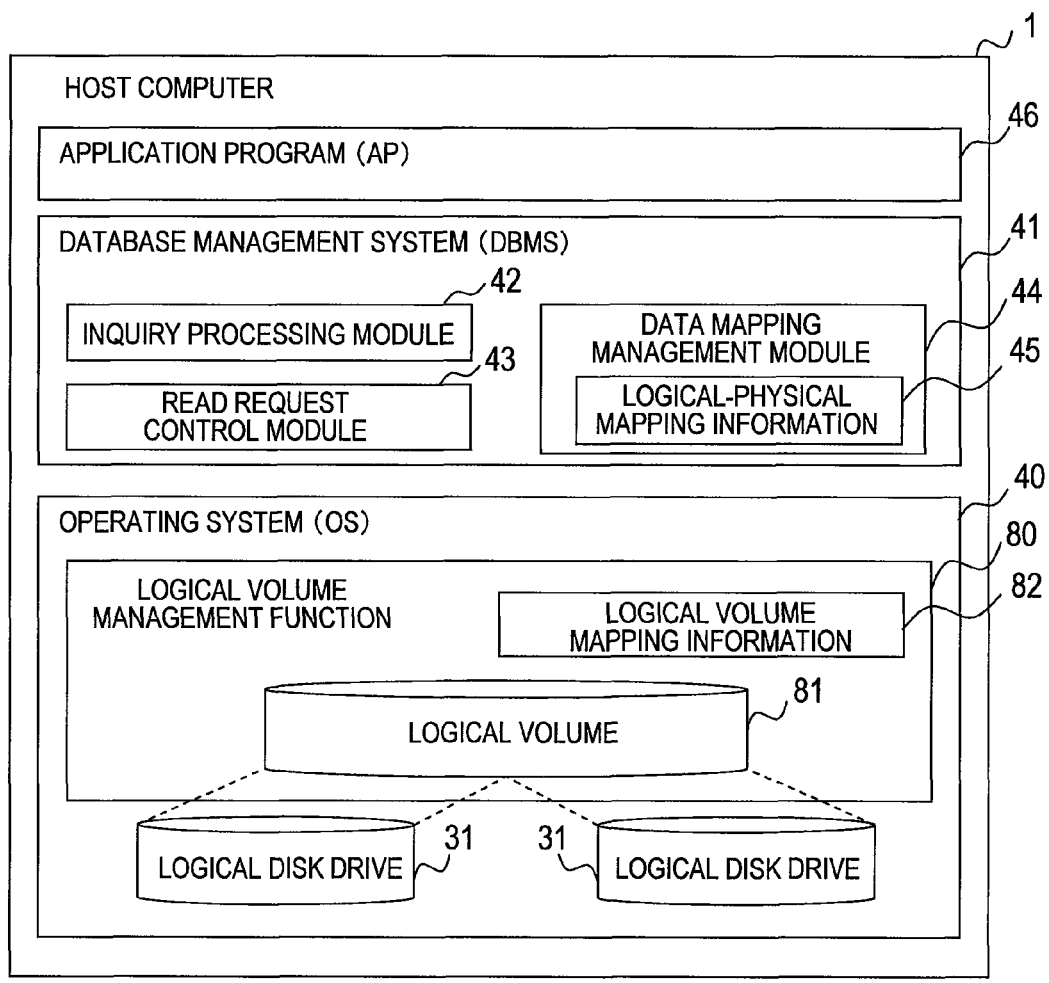
FIG. 13 is a block diagram showing the logical configuration of a host computer 1 according to a second embodiment of this invention.

FIG. 13 is a diagram showing the logical configuration of the host computer 1 according to the second embodiment of this invention. The hardware configuration of the information processing system and the logical configuration of the storage system 2 in the second embodiment of this invention are the same as in the first embodiment of this invention. The storage system 2 is therefore omitted from FIG. 13.

The host computer 1 has, in addition to the logical configuration of the first embodiment, a logical volume management function 80 given to the OS 40.

The logical volume management function 80 is a function for managing the logical disk drives 31 recognizable to the OS 40 together as a logical volume 81. The logical volume management function 80 provides the logical volume 81 to the DBMS 41 and other upper level components.

The logical volume management function 80 may also provide the logical volume 81 constituted of a plurality of logical disk drives 31 as a snapshot, which is a backup of data at a certain instant. In this case, the logical volume management function 80 uses one of the two logical disk drives 31 as active storage device (operational volume) and uses the other logical disk drive 31 as storage device (differential volume) where data updated in the operational volume is evacuated and stored. The logical volume management function 80 structures the logical volume 81 by combining data in the operational volume and data in the differential volume, thereby obtaining a snapshot.

The logical volume management function 80 manages logical volume mapping information 82 in order to structure the logical volume 81. The logical volume mapping information 82 shows the association relation between addresses in the logical volume 81 and addresses in the logical disk drives 31 which are recognizable to the OS 40. Details of the logical volume mapping information 82 will be described later with reference to FIG. 15.

The logical volume management function 80 can migrate data dynamically within itself. Examples of dynamic data migration processing include data relocation processing based on data lifecycle management and processing of data to be updated in order to keep a snapshot. Most of these dynamic data migration operations are processed in the background without the DBMS 41 and other upper level APs being aware of the processing.

When a given condition is met, the logical volume management function 80 decides to dynamically migrate data in the logical volume 81 that fits the condition. The logical volume management function 80 reads data in the migration source logical disk drive 31 out of the storage system 2 and writes the read data in the migration destination logical disk drive 31. The logical volume management function 80 also makes the logical volume mapping information 82 reflect a change caused by the data migration. During the data migration, the logical volume management function 80 keeps accepting I/O processing requests for all data including the one that is being migrated.

The DB 35 in the second embodiment of this invention is stored in the plurality of physical disk drives 28 within the storage system 2 via the logical volume 81. This means that the read request control module 43 of the DBMS 41 issues a request to read data out of the DB 35 stored in the physical disk drives 28 to the storage system 2 via the logical volume 81.

The logical-physical mapping information 45 in the second embodiment of this invention holds the association relation between addresses in the logical volume 81 accessed by the DBMS 41 and addresses in the physical disk drives 28 of the storage system 2 which constitute the logical volume 81 via the logical disk drives 31.

The host computer 1 according to the second embodiment of this invention has only one logical volume 81 in order to simplify the description, but may have any number of logical volumes 81 each of which is constituted of one or more logical disk drives 31.

Processing of the second embodiment of this invention having the above-described configuration will be outlined.

The data mapping management module 44 obtains the storage mapping information 34 from the storage system 2 and the logical volume mapping information 82 from the logical volume management function 80 at regular intervals. The data mapping management module 44 obtains the storage mapping information 34 also when notified of dynamic data migration within the storage system 2. The data mapping management module 44 obtains the logical volume mapping information 82 also when notified of dynamic data migration within the logical volume 81. Based on the obtained information, the data mapping management module 44 constructs the logical-physical mapping information 45.

Processing of the read request control module 43 in the second embodiment is the same as in the first embodiment of this invention. The read request control module 43 therefore creates the queues 431a to 431e individually for each of the physical disk drives 28a to 28e constituting the logical disk drives 31 based on the logical-physical mapping information 45. The read request control module 43 receives a plurality of data read requests, sorts the read requests by their destinations, and accumulates the read requests in the respective queues 431a to 431e associated with the request destination physical disk drives 28a to 28e. The read request control module 43 reallocates the accumulated read requests into an order that shortens the total data read time in each of the physical disk drives 28a to 28e, and then issues the read requests to the storage system 2.

This way, data read requests can be issued in an optimum order for each of the physical disk drives 28a to 28e in the presence of changes in data location due to dynamic data migration within the storage system 2 and within the OS 40 of the host computer 1.

The description now turns to details of the processing and data configuration in the second embodiment of this invention.

Figure 14:
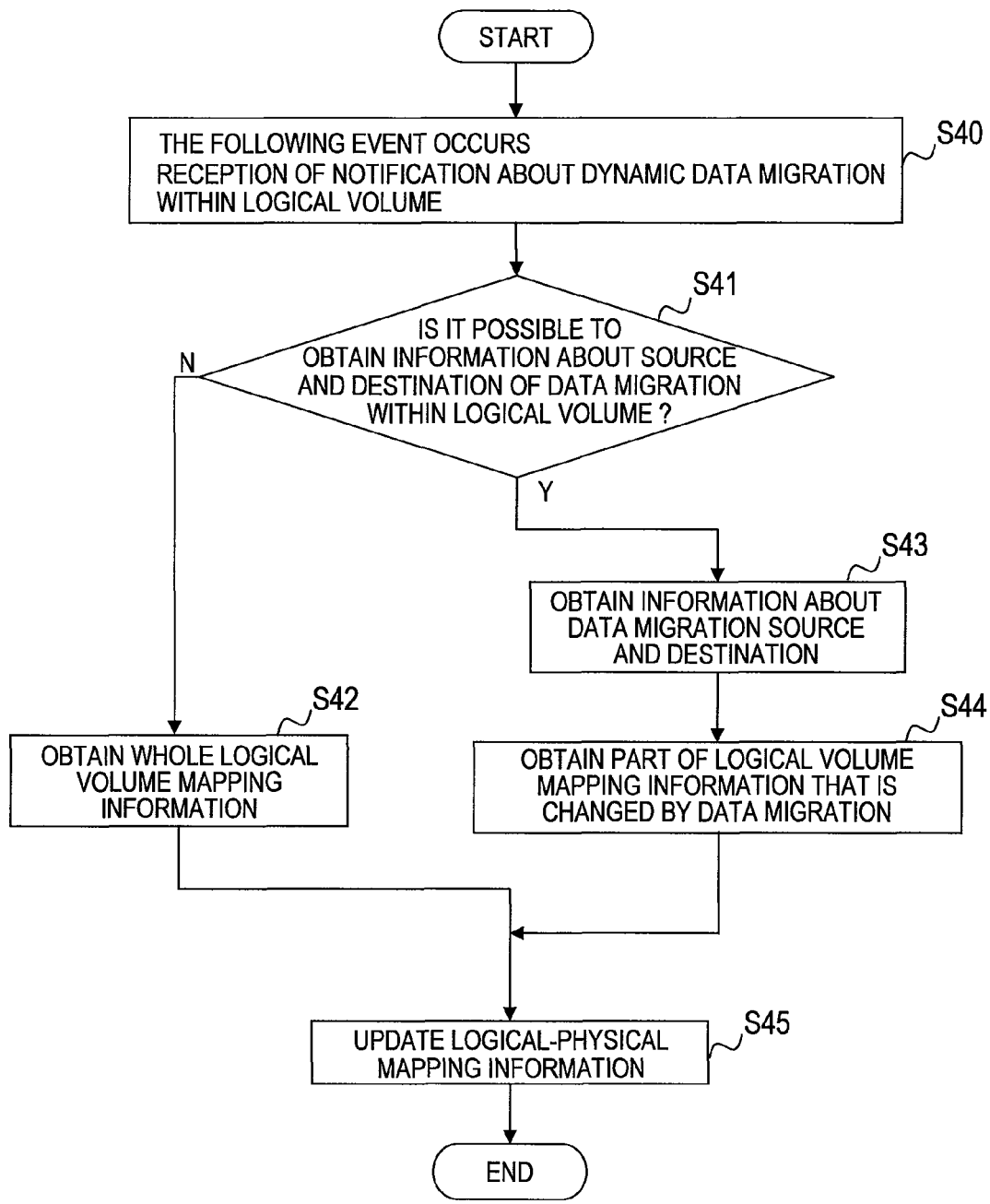
FIG. 14 is a flow chart showing steps of logical-physical mapping information constructing processing that is executed when there is dynamic data migration within logical volumes according to the second embodiment of this invention.

FIG. 14 is a flow chart showing steps of logical-physical mapping information constructing processing that is executed upon dynamic data migration within the logical volume 81 according to the second embodiment of this invention. Logical-physical mapping information constructing processing according to the second embodiment of this invention equals this processing plus the processing that is described in the first embodiment of this invention with reference to FIG. 3.

Described first is a part of the logical-physical mapping information constructing processing according to the second embodiment of this invention that is executed when Event (1) or Event (2) of FIG. 3 occurs.

The data mapping management module 44 of the DBMS 41 obtains identification information of the storage mapping information 34 from the storage system 2. The data mapping management module 44 also obtains identification information of the logical volume mapping information 82 from the logical volume management function 80 (the step corresponds to Step S3 of FIG. 3). The identification information of the logical volume mapping information 82 contains, for example, last update date/time information, version information, and checksum information. These identification information pieces are updated by the OS 40 when the logical volume mapping information 82 is changed.

The data mapping management module 44 judges whether or not the identification information of the storage mapping information 34 differs from one obtained last time. Similarly, the data mapping management module 44 judges whether or not the identification information of the logical volume mapping information 82 differs from one obtained last time (the step corresponds to Step S4 of FIG. 3).

When it is judged that the identification information of the storage mapping information 34 and the identification information of the logical volume mapping information 82 are respectively the same as the ones obtained last time (the answer to the step corresponding to S4 of FIG. 3 is "N"), the data mapping management module 44 judges that changes have been made to neither the storage mapping information 34 nor the logical volume mapping information 82, which means that there have been no changes in data location in the storage system 2 and in the logical volume 81, and ends the processing.

When it is judged that the identification information of the storage mapping information 34 differs from the one obtained last time, the data mapping management module 44 obtains the whole storage mapping information 34 from the storage system 2. When it is judged that the identification information of the logical volume mapping information 82 differs from the one obtained last time, the data mapping management module 44 obtains the whole logical volume mapping information 82 from the logical volume management function 80 (the step corresponds to Step S5 of FIG. 3).

From the obtained storage mapping information 34 or logical volume mapping information 82, the data mapping management module 44 constructs the logical-physical mapping information 45 of the second embodiment which associates addresses in the logical volume 81 accessed by the DBMS 41 with addresses in the physical disk drives 28 within the storage system 2 (the step corresponds to S6). In the case where the logical volume mapping information 82 is obtained but not the storage mapping information 34, the data mapping management module 44 ends the processing at this point.

In the case where the storage mapping information 34 is obtained, the read request control module 43 creates the queues 431a to 431e individually for each of the physical disk drives 28a to 28e, which constitute the logical volume 81, based on the logical-physical mapping information 45 (the step corresponds to S7). The processing is then ended.

What should be described next is a part of the logical-physical mapping information constructing processing according to the second embodiment of this invention that is executed upon Event (3) of FIG. 3. However, this part is similar to the processing in FIG. 3, and the description will be omitted here.

Lastly, a description will be given with reference to FIG. 14 on a part of the logical-physical mapping information constructing processing according to the second embodiment of this invention that is executed upon dynamic data migration within the logical volume.

The data mapping management module 44 waits for Event (4) to happen (S40). Event (4) is reception of a notification from the logical volume management function 80 or the management terminal 3 about dynamic data migration within the logical volume 81.

Receiving an Event (4) notification from the OS 40 about dynamic data migration within the logical volume 81, the data mapping management module 44 judges whether or not information can be obtained about the data migration source and destination in the logical volume 81 (S41). To give a specific example, the data mapping management module 44 judges whether or not the received data migration notification contains information about the data migration source and destination.

When it is judged that information about the data migration source and destination cannot be obtained (the answer to S41 is "N"), the data mapping management module 44 makes a request to the logical volume management function 80 to obtain the whole logical volume mapping information 82. The logical volume management function 80 receives the request and sends the logical volume mapping information 82 in its entirety to the DBMS 41. The data mapping management module 44 thus obtains the whole logical volume mapping information 82 (S42). The data mapping management module 44 may obtain the whole logical volume mapping information 82 at once, or may obtain a portion at a time.

When it is judged that information about the data migration source and destination can be obtained (the answer to S41 is "Y"), the data mapping management module 44 obtains this information (S43). For example, the data mapping management module 44 obtains, from the received data migration notification, information including the size of migrating data and identification information and access destination address of the logical disk 31 which are the data migration source and destination in the logical volume.

The data mapping management module 44 uses the obtained information about the data migration source and destination, thereby making a request to the logical volume management function 80 to obtain a part of the logical volume mapping information 82 that is changed as a result of the data migration. The logical volume management function 80 receives the request and sends the requested partial information of the logical volume mapping information 82 to the DBMS 41. The data mapping management module 44 thus obtains the part of the logical volume mapping information 82 that is changed as a result of the data migration (S44). The data mapping management module 44 may obtain the desired part of the logical volume mapping information 82 all at once, or may obtain a portion at a time.

Using the logical volume mapping information 82 obtained in Step S42 or S44, the data mapping management module 44 updates the logical-physical mapping information 45 of the second embodiment, which associates addresses in the logical volume 81 accessed by the DBMS 41 and addresses in the physical disk drives 28 in the storage system 2, and then ends the processing (S45).

The processing of FIG. 14 does not include creating a plurality of queues 431 anew for a plurality of physical disk drives 28 which constitute the logical volume 81. This is because dynamic data migration within the logical volume 81 does not change the configurations of the physical disk drives 28 in the storage system 2.

FIG. 15 is a diagram showing an example of the logical volume mapping information 82 according to the second embodiment of this invention. The logical volume mapping information 82 contains in each record entry a logical volume number 90, a logical volume internal address 91, a host logical disk drive number 92, and a host logical disk drive internal address 93.

The logical volume number 90 indicates a number used in the host computer 1 to identify each logical volume 81. The logical volume internal address 91 indicates an address in the logical volume 81 that is identified by the logical volume number 90, and the address is a logical address provided to the DBMS 41 and other upper level APs.

The host logical disk drive number 92 indicates a number for identifying each logical disk drive 31 recognizable to the OS 40. The host logical disk drive internal address 93 indicates an address in the logical disk drive 31 that is identified by the host logical disk drive number 49, and the address is a logical address used in the OS 40 to access the logical disk drive 31.

The logical volume mapping information 82 thus shows the association relation between addresses in the logical volume 81 which are provided to upper level APs and addresses in the logical disk drives 31 which are recognizable to the OS 40.

How the logical volume mapping information 82 is changed as a result of dynamic data migration within the logical volume 81 will now be described. Examples of the change are shown in brackets in the records of FIG. 15. Take an example in which data indicated by a host logical disk drive number "01" and a host logical disk drive internal address "128K~256K" migrates internally to a storage area indicated by a host logical disk drive number "02" and a host logical disk drive internal address "0~128K". The logical volume management function 80 changes the records (second from the top in FIG. 15) such that the host logical disk drive number 92 is changed from "01" to "02" and the host logical disk drive internal address 93 is changed from "128K~256K" to "0~128K". In this example, the logical volume management function 80 does not change the logical volume number 90 and the logical volume internal address 91 since this data migration is dynamic data migration within the logical volume 81 which is executed by a virtualization function (the logical volume management function 80) of the OS 40 and which upper APs are not aware of.

FIG. 16 is a diagram showing an example of the logical-physical mapping information 45 according to the second embodiment of this invention. The logical-physical mapping information 45 of the second embodiment, contains in each record entry a logical volume number 94, a logical volume internal address 95, a physical disk drive number 96, and a physical disk drive internal address 97.

The logical volume number 94 indicates a number used in the host computer 1 to identify each logical volume 81, and is the same as the logical volume number 90 of FIG. 15. The logical volume internal address 95 indicates an address in the logical volume 81 that is identified by the logical volume number 94, and is the same as the logical volume internal address 91 of FIG. 15.

The physical disk drive number 96 indicates an identification number that is assigned to each of the physical disk drives 28a to 28e constituting a logical storage area in the host computer 1 that is identified by the logical volume number 94 and the logical volume internal address 95. The physical disk drive number 96 is the same as the physical disk drive number 53 described in the first embodiment of this invention with reference to FIG. 4. The physical disk drive internal address 97 indicates a physical address in the physical disk drive 28 that constitutes the above logical storage area in the host computer 1. The physical disk drive internal address 97 is the same as the physical disk drive internal address 54 described in the first embodiment of this invention with reference to FIG. 4.

The logical-physical mapping information 45 thus holds the association relation between addresses in the logical volume 81 accessed by the DBMS 41 and addresses in the physical disk drives 28 constituting the logical volume 81 via the logical disk drives 31.

A simple description will be given on how the logical-physical mapping information 45 is changed when the data mapping management module 44 obtains the storage mapping information 34 and the logical volume mapping information 82 that have been changed as a result of dynamic data migration. Take an example in which dynamic data migration within the logical volume 81 occurs first to be followed by dynamic data migration within the storage system 2, causing changes in the obtained storage mapping information 34 as shown in brackets in the records of FIG. 4 in the first embodiment and changes in the obtained logical volume mapping information 82 as shown in brackets in the records of FIG. 15. Then the logical-physical mapping information 45 is changed as shown in brackets in the records of FIG. 16. FIG. 16 uses "⇒" to indicate data migration within the logical volume 81 and "→" to indicate data migration within the storage system 2.

As has been described, the second embodiment of this invention includes, in addition to the processing of the first embodiment of this invention, processing in which the DBMS obtains partial or whole logical volume mapping information 82, whichever is appropriate, to construct and utilize the logical-physical mapping information 45. This makes it possible to issue data read requests in an optimum order suited to the dynamically changing physical data location in the storage system 2 and in the OS 40. Therefore, the storage system 2 and the OS 40 can both use their storage area virtualization functions without the fear of losing the effect of this invention which shortens and stabilizes the time required to make an inquiry to the storage system 2.

Third Embodiment

A third embodiment of this invention will be described below. The description will focus on the differences from the first and second embodiments, and components that provide the same functions as the components in the first and second embodiments will be denoted by the same reference symbols in order to omit repetitive descriptions.

The first embodiment shows an example in which the DBMS 41 obtains the storage mapping information 34 from the storage system 2 and reallocates read requests by physical addresses in the physical disk drives 28. The second embodiment shows an example in which the logical volume mapping information 82 is obtained from the logical volume management function 80 within the host computer 1 and read requests are reallocated by physical addresses in the physical disk drives 28. Described in the third embodiment is a mode in which the management terminal 3 keeps the storage mapping information 34 and logical volume management information and the DBMS 41 obtains these mapping information and management information from the management terminal 3.

Figure 17:
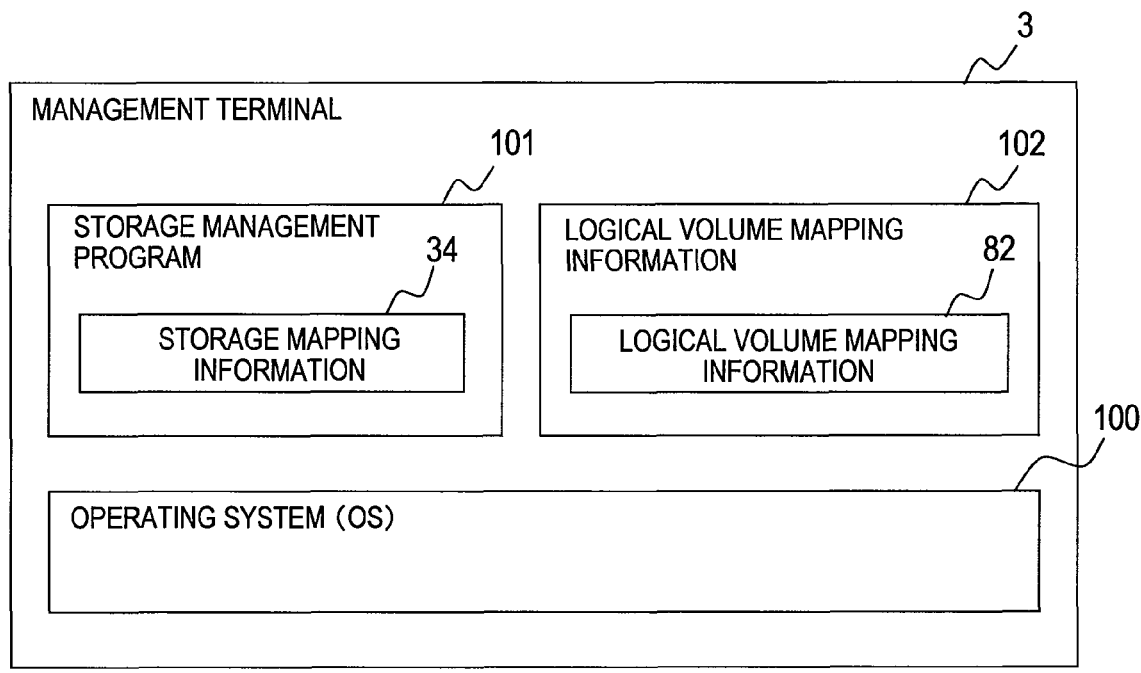
FIG. 17 is a block diagram showing the logical configuration of a management terminal according to a third embodiment of this invention.

FIG. 17 is a block diagram showing the logical configuration of the management terminal 3 according to the third embodiment of this invention. The hardware configuration of the information processing system in the third embodiment is the same as in the first and second embodiments. The logical configurations of the host computer 1 and the storage system 2 in the third embodiment are the same as in the second embodiment.

The management terminal 3 holds in a memory or local storage various programs including an OS 100, which controls the computer, a storage management program 101, and a logical volume management program 102, and information necessary to execute the programs.

The storage management program 101 manages the configuration of the storage system 2. The storage management program 101 has the storage mapping information 34, which is used to manage the association relation between addresses in the logical disk drives 31 and addresses in the physical disk drives 28. The storage mapping information 34 of the management terminal 3 is the same as the storage mapping information 34 of the storage system 2 shown in FIG. 2. The storage management program 101 obtains the storage mapping information 34 from the storage system 2 periodically or when the storage mapping information 34 is updated.

The logical volume management program 102 manages the configuration of the logical volume 81. The logical volume management program 102 has the logical volume mapping information 82, which shows the association relation between addresses in the logical volume 81 and addresses in the logical disk drives 31 which are recognizable to the OS 40. The logical volume mapping information 82 of the management terminal 3 is the same as the one in the logical volume management function 80 of the host computer 1. The logical volume management program 102 obtains the logical volume mapping information 82 from the logical volume management function 80 of the host computer 1 periodically or when the logical volume mapping information 82 is updated.

Processing in the third embodiment of this invention having the above-described configuration will be described.

The data mapping management module 44 obtains the storage mapping information 34 and the logical volume mapping information 82 from the management terminal 3 at regular intervals. The data mapping management module 44 obtains the storage mapping information 34 from the management terminal 3 also when notified of dynamic data migration within the storage system 2. The data mapping management module 44 obtains the logical volume mapping information 82 from the management terminal 3 also when notified of dynamic data migration within the logical volume 81. The data mapping management module 44 then constructs the logical-physical mapping information 45 from the obtained information.

The above-described logical-physical mapping information constructing processing of the third embodiment of this invention equals the processing described in the first embodiment of this invention with reference to FIG. 3 plus the processing described in the second embodiment of this invention with reference to FIG. 14. The difference from the first and second embodiments of this invention is that it is from the management terminal 3 that the storage mapping information 34 and the logical volume mapping information 82 are obtained.

Processing of the read request control module 43 in the third embodiment is the same as in the first and second embodiments of this invention. The read request control module 43 therefore creates the queues 431a to 431e individually for each of the physical disk drives 28a to 28e constituting the logical disk drives 31 based on the logical-physical mapping information 45. The read request control module 43 receives a plurality of data read requests, sorts the read requests by their destinations, and accumulates the read requests in the respective queues 431a to 431e associated with the request destination physical disk drives 28a to 28e. The read request control module 43 reallocates the accumulated read requests into an order that shortens the total data read time in each of the physical disk drives 28a to 28e, and then issues the read requests to the storage system 2.

According to the third embodiment of this invention, as in the second embodiment of this invention, data read requests can be issued in an optimum order in the presence of dynamic changes in physical data location within the storage system 2 and within the OS 40, and the inquiry time can thus be shortened and stabilized.

Furthermore, since the DBMS 41 in the third embodiment of this invention obtains the storage mapping information 34 and the logical volume mapping information 82 from the management terminal 3, the load of obtaining the information is removed from the load on the storage system 2 and from the load on the logical volume management function 80 of the host computer 1.

<Supplement>

The data management system according to claim 18, wherein the computer provides an interface that accepts an input regarding a given count which indicates how many read requests can be accumulated, and uses the input made through the interface to set the given count.

The data management system according to claim 11, wherein the computer has a database management system, which reads a database stored in the storage system.

While the present invention has been described in detail and pictorially in the accompanying drawings, the present invention is not limited to such detail but covers various obvious modifications and equivalent arrangements, which fall within the purview of the appended claims.

What is claimed is:

1. A data reading method of enabling a computer coupled to a storage system to read data out of a logical disk drive which is provided by the storage system and includes a plurality of physical disk drives, the method comprising the steps of:

obtaining, when a given condition is met, by the computer, first mapping information which shows a relation between addresses in the plurality of physical disk drives in the storage system and addresses in the logical disk drive;

constructing, from the obtained first mapping information, second mapping information which associates the addresses in the logical disk drive which are recognizable to the computer with the addresses in the plurality of physical disk drives in the storage system;

creating, by the computer, a queue for each of the plurality of physical disk drives from the second mapping information;

identifying, upon reception of a plurality of read requests, which ones of the plurality of physical disk drives store the data requested by the plurality of read requests, and accumulating the plurality of read requests in respective queues of the identified physical disk drives; and issuing, after the plurality of read requests accumulated in the respective queues of the plurality of physical disk drives are reallocated into an order that shortens data read time of the plurality of physical disk drives, the plurality of read requests from the queues to the storage system, wherein, in the step of obtaining the first mapping information which shows the relation of the addresses in the logical disk drive, the computer obtains identification information of the first mapping information and obtains the first mapping information, when the obtained identification information differs from the identification information obtained last time.

2. The data reading method according to claim 1, wherein the step of obtaining the first mapping information which shows the relation of the addresses in the logical disk drive comprises the steps of:

sending, by the computer, a request to obtain the first mapping information;

receiving, by the storage system, the request to obtain the first mapping information from the computer; and sending, by the storage system, the first mapping information to the computer as requested by the request.

3. The data reading method according to claim 1, further comprising:

a second computer which is coupled to the computer and to the storage system and has the first mapping information, the method further comprising the steps of:

sending, by the computer, a request to obtain the first mapping information;

receiving, by the second computer, the request to obtain the first mapping information from the computer; and sending, by the second computer, the first mapping information to the computer as requested by the request.

4. The data reading method according to claim 1, wherein the storage system provides a plurality of logical disk drives including the plurality of physical disk drives, wherein the computer manages the plurality of logical disk drives that the storage system provides together as a logical volume, wherein the method further comprises the step of obtaining, when the given condition is met, by the computer, third mapping information which associates the addresses in the plurality of logical disk drives with the addresses in the logical volume, and wherein, in the step of constructing the second mapping information, second mapping information that associates the addresses in the logical volume and the addresses in the plurality of physical disk drives within the storage system is constructed from the obtained third mapping information and the first mapping information.

5. The data reading method according to claim 1, wherein time at which the given condition is met comprises time at which a given time interval has passed, wherein the computer is configured to:
provide an interface that accepts an input regarding the given time interval at which the first mapping information is obtained; and
set the given time interval using the input made through the interface.

6. The data reading method according to claim 1, wherein, in the step of obtaining the first mapping information which shows the relation of addresses in the logical disk drive, when receiving a notification about data migration within the storage system, the computer obtains a part of the first mapping information that is relevant to the data migration.

7. The data reading method according to claim 6, wherein the dynamic migration of data within the storage system is one of relocation of the data, processing of replicating the data, and processing of restoring data stored in a physical disk drive where a failure has occurred.

8. A data reading method of enabling a computer coupled to a storage system to read data out of a logical disk drive which is provided by the storage system and includes a plurality of physical disk drives, the method comprising the steps of:
obtaining, when a given condition is met, by the computer, first mapping information which shows a relation between addresses in the plurality of physical disk drives in the storage system and addresses in the logical disk drive;
constructing, from the obtained first mapping information, second mapping information which associates the addresses in the logical disk drive which are recognizable to the computer with the addresses in the plurality of physical disk drives in the storage system;
creating, by the computer, a queue for each of the plurality of physical disk drives from the second mapping information;
identifying, upon reception of a plurality of read requests, which ones of the plurality of physical disk drives store the data requested by the plurality of read requests, and accumulating the plurality of read requests in respective queues of the identified physical disk drives; and
issuing, after the plurality of read requests accumulated in the respective queues of the plurality of physical disk drives are reallocated into an order that shortens data read time of the plurality of physical disk drives, the plurality of read requests from the queues to the storage system,
wherein the step of issuing the plurality of read requests from the queues to the storage system includes the steps of:
when the computer receives a notification about start of dynamic data migration within the storage system, changing current read request issuing conditions of the queues that are associated with a data migration source physical disk drive and a data migration destination physical disk drive such that data read requests are accumulated to a given count in the queues to be issued at once;
when the plurality of read requests are received which request to read data out of the data migration source physical disk drive and the data migration destination physical disk drive, accumulating the plurality of read requests until the given count is reached and then issuing the accumulated plurality of read requests in accordance with the changed read request issuing conditions; and
when the computer receives a notification about end of the data migration, removing the changed read request issuing conditions.

9. The data reading method according to claim 8, wherein the computer is configured to:
provide an interface that accepts an input regarding the given count which indicates how many read requests can be accumulated, and set the given count using the input made through the interface.

10. A data management system comprising: a storage system which provides a logical disk drive including a plurality of physical disk drives; and
a computer which is coupled to the storage system and reads data from the logical disk drive,
wherein the computer includes:
an inquiry processing module which receives an inquiry and makes a request to read data relevant to the inquiry;
a mapping management module which obtains first mapping information when a given condition is met, the first mapping information associating addresses in the plurality of physical disk drives in the storage system and addresses in the logical disk drive; and
a read request control module which receives a plurality of data read requests generated by the inquiry processing module, and issues requests to read data out of the plurality of physical disk drives in the storage system via the logical disk drive,
wherein the mapping management module constructs second mapping information from the obtained first mapping information, the second mapping information associating the addresses in the logical disk drive which are recognizable to the computer and the addresses in the plurality of physical disk drives of the storage system, and
wherein the read request control module is configured to:
create a queue for each of the plurality of physical disk drives based on the second mapping information constructed by the mapping management module;
identify, upon reception of the plurality of read requests generated by the inquiry processing module, which ones of the plurality of physical disk drives are destinations of the plurality of read requests using the second mapping information, and accumulate the plurality of read requests in respective queues of the identified physical disk drives; and
reallocate the plurality of read requests accumulated in the respective queues of the plurality of physical disk drives into a given order that shortens data read time in the respective plurality of physical disk drives, and then issue the plurality of read requests from the queues to the storage system,
wherein the mapping management module obtains identification information of the first mapping information and obtains the first mapping information, when the obtained identification information differs from the identification information obtained last time.

11. The data management system according to claim 10, wherein the mapping management module sends to the storage system a request to obtain the first mapping information, and
wherein the storage system has a control module which receives the request and responds by sending the first mapping information.

12. The data management system according to claim 10, further comprising:
a second computer which is coupled to the computer and to the storage system and which has the first mapping information, wherein the mapping management module of the computer sends a request to obtain the first mapping information, and wherein the second computer receives the request to obtain the first mapping information from the computer, and sends the first mapping information to the computer as requested by the request.

13. The data management system according to claim 10, wherein the storage system provides a plurality of logical disk drives including the plurality of physical disk drives, wherein the computer includes a logical volume management module which manages the plurality of logical disk drives that the storage system provides together as a logical volume, wherein the mapping management module is configured to: obtain, when the given condition is met, third mapping information which associates the addresses in the plurality of logical disk drives with the addresses in the logical volume; and construct the second mapping information that associates the addresses in the logical volume and the addresses in the plurality of physical disk drives within the storage system from the obtained third mapping information and the first mapping information.

14. The data management system according to claim 10, wherein time at which the given condition is met comprises time at which a given time interval has passed, wherein the computer is configured to:

provide an interface that accepts an input regarding the given time interval at which the first mapping information is obtained; and set the given time interval using the input made through the interface.

15. The data management system according to claim 10, wherein, when receiving a notification about data migration within the storage system, the mapping management module obtains a part of the first mapping information that is relevant to the data migration.

16. A data management system comprising: a storage system which provides a logical disk drive including a plurality of physical disk drives; and a computer which is coupled to the storage system and reads data from the logical disk drive, wherein the computer includes:

an inquiry processing module which receives an inquiry and makes a request to read data relevant to the inquiry;

a mapping management module which obtains first mapping information when a given condition is met, the first mapping information associating addresses in the plurality of physical disk drives in the storage system and addresses in the logical disk drive; and a read request control module which receives a plurality of data read requests generated by the inquiry processing module, and issues requests to read data out of the plurality of physical disk drives in the storage system via the logical disk drive, wherein the mapping management module constructs second mapping information from the obtained first mapping information, the second mapping information associating the addresses in the logical disk drive which are recognizable to the computer and the addresses in the plurality of physical disk drives of the storage system, and wherein the read request control module is configured to:

create a queue for each of the plurality of physical disk drives based on the second mapping information constructed by the mapping management module;

identify, upon reception of the plurality of read requests generated by the inquiry processing module, which ones of the plurality of physical disk drives are destinations of the plurality of read requests using the second mapping information, and accumulate the plurality of read requests in the respective queues of the identified physical disk drives; and reallocate the plurality of read requests accumulated in the respective queues of the plurality of physical disk drives into a given order that shortens data read time in the respective plurality of physical disk drives, and then issue the plurality of read requests from the queues to the storage system, wherein the read request control module is configured to:

when receiving a notification about start of dynamic data migration within the storage system, change current read request issuing conditions of the queues that are associated with a data migration source physical disk drive and a data migration destination physical disk drive such that data read requests are accumulated to a given count in the respective queues to be issued at once;

accumulate, when receiving a plurality of read requests which request to read data out of the data migration source physical disk drive and the data migration destination physical disk drive, the plurality of read requests until the given count is reached and then issue the accumulated plurality of read requests in accordance with the changed read request issuing conditions; and when the computer receives a notification about end of the data migration, removing the changed read request issuing conditions.

17. A storage system which provides a logical disk drive to a computer, comprising:

a plurality of physical disk drives; the logical disk drive including the plurality of physical disk drives; and first mapping information associating addresses in the plurality of physical disk drives with addresses in the logical disk drive, wherein the storage system is configured to:

provide the computer with an interface through which a request to obtain the first mapping information is made; and send the first mapping information to the computer as requested by the request made through the interface, wherein the mapping management module obtains identification information of the first mapping information and obtains the first mapping information, when the obtained identification information differs from the identification information obtained last time.

18. The storage system according to claim 17, further comprising:

information for identifying the first mapping information, wherein the storage system is configured to:

provide the computer with the interface through which a request is made to obtain information for identifying the first mapping information, and send information for identifying the first mapping information to the computer as requested by the request made through the interface.

* * * * *